(12) United States Patent
Jain

(10) Patent No.: US 9,350,601 B2
(45) Date of Patent: May 24, 2016

(54) NETWORK EVENT PROCESSING AND PRIORITIZATION

(71) Applicant: Microsoft Corporation, Redmond, WA (US)

(72) Inventor: Navendu Jain, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 111 days.

(21) Appl. No.: 13/924,452

(22) Filed: Jun. 21, 2013

(65) Prior Publication Data

US 2014/0379895 A1    Dec. 25, 2014

(51) Int. Cl.
H04L 12/26    (2006.01)
H04L 12/24    (2006.01)
H04L 29/14    (2006.01)
G06F 11/20    (2006.01)

(52) U.S. Cl.
CPC ........ H04L 41/0609 (2013.01); H04L 41/0654 (2013.01); H04L 69/40 (2013.01); G06F 11/2025 (2013.01); H04L 43/08 (2013.01)

(58) Field of Classification Search
CPC . H04L 69/40; H04L 41/0609; H04L 41/0654; H04L 43/08; G06F 11/2025
See application file for complete search history.

(56) References Cited

U.S. PATENT DOCUMENTS

| | | | |
|---|---|---|---|
| 4,816,994 A | 3/1989 | Freiling et al. | |
| 5,483,637 A | 1/1996 | Winokur et al. | |
| 6,118,936 A | 9/2000 | Lauer et al. | |
| 6,131,112 A | 10/2000 | Lewis et al. | |
| 6,249,755 B1 | 6/2001 | Yemini et al. | |
| 6,353,902 B1 | 3/2002 | Kulatunge et al. | |
| 6,742,141 B1 | 5/2004 | Miller | |
| 6,785,226 B1 | 8/2004 | Oltman et al. | |
| 6,820,221 B2 | 11/2004 | Fleming | |
| 6,829,734 B1 | 12/2004 | Kreulen et al. | |

(Continued)

FOREIGN PATENT DOCUMENTS

| | | |
|---|---|---|
| EP | 2037625 A1 | 3/2009 |
| WO | 98/47265 A1 | 10/1998 |

(Continued)

OTHER PUBLICATIONS

Mann et al., "On a Test of Whether One of Two Random Variables is Stochastically Larger than the Other," Annals of Mathematical Statistics, 1947, 11 pages.

(Continued)

*Primary Examiner* — Krisna Lim
(74) *Attorney, Agent, or Firm* — Sandy Swain; Micky Minhas

(57) ABSTRACT

The described implementations relate to processing of electronic data. One implementation is manifest as a system that can include an event analysis component and one or more processing devices configured to execute the event analysis component. The event analysis component can be configured to obtain multiple events that are generated by network devices in a networking environment. The event analysis component can also be configured to identify impactful events from the multiple events. The impactful events can have associated device-level or link-level impacts. The event analysis component can also be configured to determine one or more failure metrics for an individual impactful event. The one or more failure metrics can include at least a first redundancy-related failure metric associated with redundant failovers in the networking environment.

20 Claims, 10 Drawing Sheets

(56) References Cited

U.S. PATENT DOCUMENTS

| | | | |
|---|---|---|---|
| 7,010,593 B2 | 3/2006 | Raymond | |
| 7,039,827 B2 | 5/2006 | Meyer et al. | |
| 7,047,291 B2 | 5/2006 | Breese et al. | |
| 7,085,697 B1 | 8/2006 | Rappaport et al. | |
| 7,209,923 B1 | 4/2007 | Cooper | |
| 7,228,453 B2 | 6/2007 | O'Brien et al. | |
| 7,246,159 B2 | 7/2007 | Aggarwal et al. | |
| 7,313,736 B2 | 12/2007 | Scrandis et al. | |
| 7,315,887 B1 | 1/2008 | Liang et al. | |
| 7,451,210 B2 | 11/2008 | Gupta et al. | |
| 7,539,907 B1 | 5/2009 | Johnsen et al. | |
| 7,565,661 B2 | 7/2009 | Sim-Tang | |
| 7,580,956 B1 | 8/2009 | Xin et al. | |
| 7,596,083 B2 | 9/2009 | Klos | |
| 7,813,298 B2 | 10/2010 | Lidstrom | |
| 7,853,544 B2 | 12/2010 | Scott et al. | |
| 7,965,620 B2 | 6/2011 | Gadgil et al. | |
| 7,995,485 B1 | 8/2011 | Anderson et al. | |
| 8,032,489 B2 | 10/2011 | Villella et al. | |
| 8,046,637 B2 | 10/2011 | Gross et al. | |
| 8,107,363 B1* | 1/2012 | Saluja | 370/228 |
| 8,112,667 B2 | 2/2012 | Belluomini et al. | |
| 8,135,995 B2 | 3/2012 | Ngai et al. | |
| 8,161,325 B2 | 4/2012 | Calman et al. | |
| 8,169,921 B2 | 5/2012 | Yang et al. | |
| 8,181,071 B2 | 5/2012 | Cahill et al. | |
| 8,195,692 B2 | 6/2012 | Baek et al. | |
| 8,260,893 B1 | 9/2012 | Bandhole et al. | |
| 8,738,968 B2 | 5/2014 | Kanso et al. | |
| 8,831,202 B1* | 9/2014 | Abidogun et al. | 379/221.03 |
| 8,838,599 B2 | 9/2014 | Xu et al. | |
| 8,862,948 B1 | 10/2014 | Lam | |
| 8,892,550 B2 | 11/2014 | Chu-Carroll et al. | |
| 8,892,960 B2 | 11/2014 | Sambamurthy et al. | |
| 8,996,539 B2 | 3/2015 | Agrawal et al. | |
| 9,065,730 B2 | 6/2015 | Craig et al. | |
| 9,183,194 B2 | 11/2015 | Verma et al. | |
| 9,201,955 B1 | 12/2015 | Quintao et al. | |
| 2002/0124214 A1 | 9/2002 | Ahrens et al. | |
| 2002/0156817 A1 | 10/2002 | Lemus | |
| 2002/0161873 A1 | 10/2002 | McGuire | |
| 2002/0174384 A1 | 11/2002 | Graichen et al. | |
| 2003/0014462 A1 | 1/2003 | Bennett et al. | |
| 2003/0023719 A1 | 1/2003 | Castelli et al. | |
| 2003/0034995 A1 | 2/2003 | Osborn et al. | |
| 2003/0046615 A1 | 3/2003 | Stone | |
| 2003/0093481 A1 | 5/2003 | Mitchell et al. | |
| 2003/0110408 A1 | 6/2003 | Wells et al. | |
| 2003/0123446 A1 | 7/2003 | Muirhead et al. | |
| 2003/0172046 A1 | 9/2003 | Scott | |
| 2004/0088386 A1 | 5/2004 | Aggarwas | |
| 2004/0225952 A1 | 11/2004 | Brown et al. | |
| 2005/0138170 A1 | 6/2005 | Cherkasova et al. | |
| 2005/0138486 A1 | 6/2005 | Gromyko | |
| 2005/0154690 A1 | 7/2005 | Nitta et al. | |
| 2005/0171948 A1 | 8/2005 | Knight | |
| 2005/0181835 A1 | 8/2005 | Lau et al. | |
| 2005/0188240 A1 | 8/2005 | Murphy et al. | |
| 2005/0222811 A1 | 10/2005 | Jakobson et al. | |
| 2005/0276217 A1 | 12/2005 | Gadgil et al. | |
| 2006/0179432 A1 | 8/2006 | Walinga et al. | |
| 2006/0218267 A1 | 9/2006 | Khan et al. | |
| 2007/0028139 A1 | 2/2007 | Wahl et al. | |
| 2007/0192406 A1 | 8/2007 | Frietsch et al. | |
| 2008/0016412 A1 | 1/2008 | White et al. | |
| 2008/0077682 A1 | 3/2008 | Nair et al. | |
| 2008/0291822 A1 | 11/2008 | Farkas et al. | |
| 2009/0055684 A1 | 2/2009 | Jamjoom et al. | |
| 2009/0063387 A1 | 3/2009 | Beaty et al. | |
| 2009/0138306 A1 | 5/2009 | Coburn et al. | |
| 2009/0183030 A1 | 7/2009 | Bethke et al. | |
| 2009/0262650 A1 | 10/2009 | Shaikh et al. | |
| 2010/0034080 A1* | 2/2010 | Charzinski et al. | 370/221 |
| 2010/0049590 A1 | 2/2010 | Anshul | |
| 2010/0100775 A1 | 4/2010 | Slutsman et al. | |
| 2010/0124165 A1 | 5/2010 | Yang et al. | |
| 2010/0125745 A1 | 5/2010 | Kogan et al. | |
| 2010/0131952 A1 | 5/2010 | Akiyama et al. | |
| 2010/0138688 A1 | 6/2010 | Sykes | |
| 2010/0189113 A1 | 7/2010 | Csaszar et al. | |
| 2010/0218104 A1 | 8/2010 | Lewis | |
| 2010/0287403 A1 | 11/2010 | Jenkins et al. | |
| 2010/0302940 A1 | 12/2010 | Patel et al. | |
| 2010/0313070 A1* | 12/2010 | Joshi et al. | 714/26 |
| 2010/0332911 A1 | 12/2010 | Ramananda et al. | |
| 2011/0087522 A1 | 4/2011 | Beaty et al. | |
| 2011/0153539 A1 | 6/2011 | Rojahn | |
| 2011/0191623 A1 | 8/2011 | Dennert | |
| 2011/0239050 A1 | 9/2011 | Malisetti et al. | |
| 2011/0276836 A1 | 11/2011 | Kahana et al. | |
| 2011/0289076 A1 | 11/2011 | Boyle et al. | |
| 2011/0313962 A1 | 12/2011 | Jones et al. | |
| 2012/0185582 A1 | 7/2012 | Graessley | |
| 2012/0185735 A1 | 7/2012 | Sambamurthy et al. | |
| 2012/0213081 A1 | 8/2012 | Imai | |
| 2012/0213227 A1 | 8/2012 | Jaeger | |
| 2012/0218104 A1 | 8/2012 | Lai | |
| 2012/0239975 A1 | 9/2012 | Bodke et al. | |
| 2012/0245924 A1 | 9/2012 | Brun | |
| 2012/0254395 A1 | 10/2012 | Bonas | |
| 2012/0263044 A1 | 10/2012 | Akahane et al. | |
| 2012/0290715 A1 | 11/2012 | Dinger et al. | |
| 2013/0097304 A1 | 4/2013 | Asthana et al. | |
| 2013/0138419 A1 | 5/2013 | Lopez et al. | |
| 2013/0204808 A1 | 8/2013 | Jiang et al. | |
| 2013/0226525 A1 | 8/2013 | Marwah et al. | |
| 2013/0227115 A1 | 8/2013 | Hobbs et al. | |
| 2013/0232382 A1 | 9/2013 | Jain et al. | |
| 2013/0286852 A1 | 10/2013 | Bowler et al. | |
| 2013/0290783 A1 | 10/2013 | Bowler et al. | |
| 2013/0291034 A1 | 10/2013 | Basile et al. | |
| 2013/0332145 A1 | 12/2013 | Bostick et al. | |
| 2013/0332399 A1 | 12/2013 | Reddy et al. | |
| 2014/0006861 A1 | 1/2014 | Jain et al. | |
| 2014/0006862 A1 | 1/2014 | Jain et al. | |
| 2014/0047271 A1 | 2/2014 | Gray et al. | |
| 2014/0136684 A1 | 5/2014 | Jain et al. | |
| 2014/0136690 A1 | 5/2014 | Jain et al. | |
| 2014/0325019 A1 | 10/2014 | Austin et al. | |
| 2015/0006519 A1 | 1/2015 | Jain et al. | |
| 2015/0032500 A1 | 1/2015 | Cope et al. | |
| 2015/0302094 A1 | 10/2015 | Bobick et al. | |
| 2015/0317301 A1 | 11/2015 | Liang et al. | |

FOREIGN PATENT DOCUMENTS

| | | |
|---|---|---|
| WO | 97/24839 A2 | 7/1999 |
| WO | 2014/078592 A2 | 5/2014 |
| WO | 2014/078668 A2 | 5/2014 |

OTHER PUBLICATIONS

Manning et al., "Introduction to Information Retrieval", Book of Introduction to Information Retrieval, May 27, 2008, 504 pages.

Manning, et al., "Foundations of Statistical Natural Language Processing", Book of Foundations of Statistical Natural Language Processing, Jun. 18, 1999, 704 pages.

Marcus et al., "Building a Large Annotated Corpus of English: The Penn Treebank", Journal of Computational Linguistics—Special Issue on Using Large Corpora, vol. 19, Issue 2, Jun. 1993, 18 pages.

Markopoulou et al., "Characterization of Failures in an IP Backbone," IEEE/ACM TON, 2008, retrieved at http://ieeexplore.ieee.org/stamp/stamp.jsp?tp=&arnumber=4456903, 14 pages.

McCallum et al., "Early Results for Named Entity Recognition with Conditional Random Fields, Feature Induction and Web-Enhanced Lexicons", Proceedings of the Seventh Conference on Natural language learning at HLT-NAACL, vol. 4, May 31, 2003, 4 pages.

McCloghrie et al., "Management Information Base for Network Management of TCP/IP-based internets," Mar. 1991, retrieved at http://www.iett.org/rfc/rfc1213.txt, 66 pages.

McKeown, et al., "Openflow: Enabling Innovation in Campus Networks", Proceedings of SIGCOMM CCR, Mar. 14, 2008, 6 pages.

(56) References Cited

OTHER PUBLICATIONS

Medem et al., "TroubleMiner: Mining Network Trouble Tickets", IFIP/IEEE International Symposium on Integrated Network Management-Workshops, Jun. 1, 2009, 7 pages.

Melchiors et al., "Troubleshooting Network Faults Using Past Experience", IEEE/IFIP Network Operations and Management Symposium, Apr. 10, 2000, 14 pages.

Meykar, Orest A., "Definitions of Effectiveness Terms: A Report on the Purpose and Contents of MIL-STD-721B", IEEE Transactions on Aerospace and Electronic Systems, vol. AES3, No. 2, Mar. 1967, pp. 165-170, 6 pages.

Mitra et al., "Automatic Text Summarization by Paragraph Extraction", Proceedings of the Workshop on Intelligent Scalable Summarization at the ACL/EACL Conference, Jul. 7, 1997, 8 pages.

Moon, Todd K., "The Expectation-Maximization Algorithm," IEEE Signal Processing Magazine, Nov. 1996, pp. 47-60, 14 pages.

Mudigonda et al., "NetLord: A Scalable Multi-Tenant Network Architecture for Virtualized Datacenters", Procs. Of ACM Sigcomm., ACM, retrieved at http://www.hpl.hp.com/personal/Praveen_Yalagandula/papers/SIGCOMM2011-Netlord.pdf, 2011, 12 pages.

Muehlen, et al., "Developing Web Services Choreography Standards L The Case of RESTvs. SOAP", Journal of Decision Support Systems—Special Issue, Jul. 2005, 35 pages.

Nagao et al., "A New Method of N-Gram Statistics for Large No. of N And Automatic Extraction of Words and Phrases from Large Text Data of Japanese", COLING '94 Proceedings of the 15th Conference on Computational Linguistics, vol. 1, Aug. 5, 1994, 5 pages.

Nedevschi et al., "Reducing Network Energy Consumption via Sleeping and Rate-Adaptation," NSDI, 2008, 14 pages.

Noy et al., "Ontology Development 101: A Guide to Creating Your First Ontology", Technical Report of Stanford Knowledge Systems Laboratory and Stanford Medical Informatics, Mar. 2001, 25 pages.

O'Connor, et al., "Practical Reliability Engineering", Wiley & Sons, 2012, pp. 1, 147 and 431, 3 pages.

Padmanabhan et al., "A Study of End-to-End Web Access Failures," CoNext, ACM, 2006, retrieved at http://citeseerx.ist.psu.edu/viewdoc/download?doi=10.1.1.71.4884&rep=rep1&type=pdf, 13 pages.

Paolacci et al., "Running Experiments on Amazon Mechanical Turk", retrieved at http://repub.eur.nl/res/pub131983/jdm10630a[1].pdf, Judgment and Decision Making, Volume. 5, No. 5, Aug. 2010, 9 pages.

Potharaju et al., "Juggling the Jigsaw: Towards Automated Problem Inference from Network Trouble Tickets," NSDI, 2013, 15 pages.

Potharaju et al., "Demystifying the Dark Side of the Middle: A Field Study of Middlebox Failures in Datacerners," ACM 2013, Oct. 23-25, 2013, Barcelona, Spain, 14 pages.

Qiu et al., "What Happened in My Network? Mining Network Events from Router Syslogs", retrieved at http://conferences.sigcomm.org/imc/2010/papers/p472.pdf, Proceedings of the 10th ACM SIGCOMM Conference on Internet Measurement, Nov. 1, 2010, 13 pages.

Raghavendra et al., "No Power Struggles: Coordinated Multi-level Power Management for the Data Center", ACM SIGOPS Operating Systems Review, vol. 42, Issue 2, Mar. 1, 2008, 12 pages.

Roughan et al., "IP Forwarding Anomalies and Improving their Detection Using Multiple Data Sources", Proceedings of the ACM SIGCOMM Workshop on Network Troubleshooting, Aug. 30, 2004, 6 pages.

Runeson, P., et al., "Detection of duplicate defect reports using natural language processing," IEEE International Conference on Software Engineering, 2007, 10 pages.

Sakia, R.M., "The Box-Cox Transformation Technique: A Review," JSTOR Statistician, 1992, 10 pages.

Scharf et al., "MP-TCP Application Interface Considerations," draft-ietf-mptcp-api-00, 2010, 26 pages.

Schroeder, et al., "Disk Failures in the Real World: What Does an MTTF of 1,000,000 Hours Mean to You?", Proceedings of FAST '07: 5th USENIX Conference on File and Storage Technologies, pp. 1-16, 16 pages.

"Attensity Text Analytics Software", Attensity White Paper, Retrieved on: Apr. 15, 2015, 14 pages.

"Cisco. UniDirectional Link Detection (UDLD)", retrieved at <<http://www.cisco.com/en/US/tech/tk866/tsd_technology_support_subprotocol_home.html>>, 2 pages.

"Cisco: Data center: Load balancing data center services", retrieved at <<http://www.cisco.com/en/US/solutions/collateral/ns340/ns517/ns224/ns668/>>, Mar. 2004, 15 pages.

"EMC Ionix Application Discovery Manager", Proceedings of ICIDS 2008, Oct. 19, 2011, 5 pages.

"Enterprise Feedback Management", Jun. 30, 2012, retrieved at <<http://www.forumresearch.com/services-enterprise-feedback-management.asp>>, 2 pages.

"HTML5: A Vocabulary and Associated APIs for HTML and XHTML," retrieved at <<http://www.w3.org/TR/2010/WD-html5-20100624/>>, Aug. 7, 2012, 23 pages.

"Microsoft Assessment and Planning Toolkit", retrieved at <<http://www.microsoft.com/sam/en/us/map.aspx>>, Sep. 23, 2010, 2 pages.

"Network Management System", retrieved at http://www.cisco.com/en/US/tech/tk869/tk769/technologies_white_paper09186a00800aea9c.shtml#inventorymanage>>, White Paper on Network Management System Best Practices—Cisco Systems, Aug. 9, 2003, 17 pages.

"Security Information & Event Manager (SIEM)", retrieved at <<http://www.enterasys.com/company/literature/siem-ds.pdf>>, Oct. 19, 2011, 7 pages.

"Spanning Tree Protocol Root Guard Enhancement", retrieved at http://www.cisco.com/application/pdf/paws/10588/74.pdf, Feb. 15, 2012, 6 pages.

"2011 ADC Security Survey Global Findings," retrieved at <<http://goo.gl/A3b2Q>>, 10 pages.

"Military Standard, Definitions of Terms for Reliability and Maintainability," Jun. 12, 1981, Department of Defense, Washington, D.C., 18 pages.

"Better Predict and Prevent Network Failure—Monolith Software for Network Management", retrieved at <<http://www.monolith-software.com/solutions/network-management.php>>, on Oct. 19, 2011, 2 pages.

"N-Gram Extraction Tools," retrieved at <<http://goo.gl/VNTJa>>on Oct. 31, 2012, 3 pages.

"Why Gmail went down: Google misconfigured load balancing servers," retrieved at <<http://goo.gl/NXTeW>>on Dec. 11, 2012, 4 pages.

"A Practitioner's Guide to More Efficient Network Management," retrieved on Feb. 8, 2012 at <<http://h10124.www1.hp.com/campaigns/us/en/software/images/Practitioners_Guide.pdf, 8 pages.

"Cisco Data Center Network Architecture," retrieved at: <<http://goo.gl/kP28P>>, 2 pages.

ABI. Enterprise Network and Data Security Spending Shows Remarkable Resilience. Jan. 2011, retrieved at <<http://www.abiresearch.com/press/3591-Enterprise+Network+and+Data+Security+Spending+Shows+Remarkable+Resilience>>, 5 pages.

Abu-Libdeh, et al., "Symbiotic Routing in Future Data Centers", Proceedings of SIGCOMM, 2010, Aug. 30-Sep. 3, 2010, 12 pages.

Aciar, Silvana, "Mining Context Information from Consumer's Reviews", Proceedings of 2nd Workshop on Context-Aware Recommender Systems, Sep. 30, 2010, 5 pages.

Aguilera, et al., "Performance Debugging for Distributed Systems of Black Boxes", Proceedings of the Nineteenth ACM Symposium on Operating Systems Principles, Oct. 19, 2003, 16 pages.

Ahn et al., "Labeling Images with a Computer Game", Proceedings of the SIGCHI Conference on Human Factors in Computing Systems, Apr. 24, 2004, 8 pages.

Aho, et al., "Efficient String Matching: An Aid to Bibliographic Search", Communications of the ACM, vol. 18, No. 6, Jun. 1975, 8 pages.

(56) References Cited

OTHER PUBLICATIONS

Ahonen et al., "Applying Data Mining Techniques for Descriptive Phrase Extraction in Digital Document Collections," 1998, IEEE, Proceedings of ADL '98, Apr. 22-24, 1998, pp. 1-10, 11 pages.
Al-Fares, et al., "A Scalable, Commodity Data Center Network Architecture", Proceedings of SIGCOMM, 2008, Aug. 17-22, 2008, pp. 63-74, 12 pages.
Non Final Office Action mailed Apr. 18, 2014 from U.S. Appl. No. 13/536,782, 10 pages.
Response filed Jul. 25, 2014 to Non Final Office Action mailed Apr. 18, 2014 from U.S. Appl. No. 13/536,782, 12 pages.
Notice of Allowance mailed Aug. 20, 2014 from U.S. Appl. No. 13/536,782, 5 pages.
Notice of Allowance mailed Feb. 17, 2015 from U.S. Appl. No. 131536,782, 6 pages.
Notice of Allowance mailed Aug. 5, 2015 from U.S. Appl. No. 13/536,782, 6 pages.
Non-Final Office Action mailed Jul. 17, 2015 from U.S. Appl. No. 13/861,857, 16 pages.
International Preliminary Report on Patentability mailed Feb. 19, 2015 from PCT Patent Application No. PCT/US2013/070327, 12 pages.
Non Final Office Action mailed Feb. 4, 2015 from U.S. Appl. No. 13/677,302, 17 pages.
Response filed May 4, 2015 to Non Final Office Action mailed Feb. 4, 2015 from U.S. Appl. No. 13/677,302, 13 pages.
Notice of Allowance mailed Aug. 5, 2015 from U.S. Appl. No. 13/677,302, 15 pages.
International Search Report & Written Opinion mailed May 19, 2014 from PCT Patent Application No. PCT/US2013/070188, 17 pages
Response to International Search Report and Written Opinion—Article 34 Demand filed Sep. 5, 2014 from PCT Patent Application No. PCT/US2013/070188, 9 pages.
Written Opinion mailed Oct. 29, 2014 from PCT Patent Application No. PCT/US2013/070188, 6 pages.
Response to Second Written Opinion filed Nov. 21, 2014 from PCT Patent Application No. PCT/US2013/070188, 8 pages.
Non-Final Office Action mailed Sep. 24, 2014 from U.S. Appl. No. 13/535,366, 16 pages.
Response filed Dec. 1, 2014 to Non-Final Office Action mailed Sep. 24, 2014 from U.S. Appl. No. 13/535,366, 13 pages.
Final Office Action mailed Feb. 12, 2015 from U.S. Appl. No. 13/535,366, 13 pages.
Response filed Apr. 30, 2015 to Final Office Action mailed Feb. 12, 2015 from U.S. Appl. No. 13/535,366, 13 pages.
Notice of Allowance mailed May 29, 2015 from U.S. Appl. No. 13/535,366, 9 pages.
Non-Final Office Action mailed Jan. 16, 2014 from U.S. Appl. No. 13/409,111, 15 pages.
Notice of Allowance mailed Feb. 13, 2015 from U.S Appl. No. 13/409,111, 8 pages.
Response filed Apr. 11, 2014 to Non-Final Office Action mailed Jan. 16, 2014 from U.S. Appl. No. 13/409,111, 14 pages.
Second Written Opinion Mailed Oct. 29, 2014, from PCT Patent Application No. PCT/US2013/070327, 11 pages.
Final Office Action mailed Jun. 2, 2014 from U.S. Appl. No. 13/409,111, 15 pages.
Response filed Sep. 2, 2014 to Final Office Action mailed Jun. 2, 2014 from U.S. Appl. No. 13/409,111, 15 pages.
Non-Final Office Action mailed Sep. 12, 2014 from U.S. Patent Application No. 13/409,111 16 pages.
Response filed Dec. 11, 2014 to Non-Final Office Action mailed Sep. 12, 2014 from U.S. Appl. No. 13/409,111, 11 pages.
Response to International Search Report & Written Opinion filed Sep. 5, 2014 from PCT Patent Application No. PCT/US2013/070327, 9 pages.
Alizadeh, et al., "Data Center TCP (DCTCP)", Proceedings of SIGCOMM, 2010, Aug. 30-Sep. 3, 2010, pp. 63-74, 12 pages.
Allman, "On the Performance of Middleboxes," Procs. of SIGCOMM IMC, ACM, 2003, 6 pages.

Argyraki et al., "Can Software Routers Scale?" PRESTO, 2008, 6 pages.
Bailey et al., "Fitting a Mixture Model by Expectation Maximization to Discover Motifs in Bipolymers," ISMB, 1994, 33 pages.
Bakkaloglu, et al., "On Correlated Failures in Survivable Storage Systems", Technical Report CMU-CS-02-129, Carnegie Mellon University, Pittsburgh, PA, May 2002, 37 pages.
Bansal, et al., "Towards Optimal Resource Allocation in Partial-Fault Tolerant Applications", Infocom, 2008, 10 pages.
Barco, et al., "Automated Troubleshooting of Mobile Networks Using Bayesian Networks", Proceedings of the IASTED International Conference Communication Systems and Networks, Sep. 9, 2002, 6 pages.
Baysal, et al., "A Bug You Like: A Framework for Automated Assignment of Bugs", IEEE 17th International Conference on Program Comprehension, May 17, 2013, 2 pages.
Behnel, et al., "Cython: C-Extensions for Python", retrieved on Oct. 31, 2012 at <<http://cython.org>>, published 2008, 3 pages.
Bendel et al., "Comparison of Skewness Coefficient, Coefficient of Variation, and Gini Coefficient as Inequality Measures within Populations," Oecologia, 1989, 7 pages.
Benson, et al., "A first look at problems in the cloud", retrieved at <<http://www.usenix.org/events/hotcloud10/tech/full$_{13}$ papers/Benson.pdf>>, Proceedings of Hot Cloud, 2010, pp. 1-7, 7 pages.
Benson, et al., "Network traffic characteristics of data centers in the wild", Proceedings of IMC, 2010, Nov. 1-3, 2010, pp. 267- 280, 14 pages.
Benson, M., "Collocations and General-Purpose Dictionaries," International Journal of Lexicography, 1990, 12 pages.
Barnes, et al., "A Hierarchical O (N log N) Force-calculation Algorithm", In Letters to Nature, vol. 324, Issue 4, Dec. 1986, 4 pages.
Bettenburg, et al., "Duplicate Bug Reports Considered Harmful Really?" IEEE International Conference on Software Maintenance, 2008, 9 pages.
Bettenburg, et al., "Extracting structural information from bug reports," ACM International Working Conference on Mining Software Repositories, 2008, 4 pages.
Bhattacharya, et al., "Automated, Highly-Accurate, Bug Assignment Using Machine Learning and Tossing Graphs", Journal of Systems and Software, vol. 85, Issue 10, Oct. 2012, 18 pages.
Biggadike et al., "Natblaster: Establishing TCP Connections Between Hosts Behind NATs," ACM Sigcomm Workshop, 2005, retrieved at <<http://sparrow.ece.cmu.edu/~adrian/projects/natblaster.pdf>>, 10 pages.
Bos, et al., "Cascading Style Sheets, Level 2 Revision 1 CSS 2.1 Specification", W3C working draft, W3C, Jun. 2005, 220 pages.
Bostock, et al., "D3: Data-Driven Documents.", IEEE Transactions on Visualization and Computer Graphics, vol. 17, No. 12, Jan. 2011, 9 pages.
Brauckhoff, et al., "Anomaly Extraction in Backbone Networks using Association Rules", Proceedings of the 9th ACM SIGCOMM Conference on Internet Measurement Conference, Nov. 4, 2009, 7 pages.
Bray, et al., "Extensible Markup Language (XML) ", Journal of World Wide Web Consortium, Dec. 8, 1997, 42 pages.
Brodkin, Jon, "Amazon EC2 Outage Calls 'Availability Zones' into Question", Retrieved at http://www.networkworld.com/news/2011/042111-amazon-ec2-zones.html, Apr. 21, 2011, 8 pages.
Brown C. E., "Coefficient of Variation," AMSGRS, 1998, 3 pages.
Brugnoni, et al., "An Expert system for Real Time Fault Diagnosis of the Italian Telecommunications Network," International Symposium on Integrated Network Management, 1993, 13 pages.
Carpenter, B., "Middleboxes: Taxonomy and issues," retrieved at <<http://goo.gl/EhJKw>>, Feb. 2002, 27 pages.
Casado, "Ethane: Taking Control of the Enterprise," ACM SIGCOMM CCR, 2007, retrieved at <<http://yuba.stanford.edu/~casado/ethane-sigcomm07.pdf, 12 pages.
Case, et al., "A Simple Network Management Protocol," retrieved at <<http://www.ietf.org/rfc/rfc1157.txt>>, May 1990, 34 pages.
Chen, et al., "Declarative configuration management for complex and dynamic networks", Retrieved at <http://www2.research.att.com/~kobus/docs/coolaid.pdf>>, Proceedings of CoNEXT, 2010, Nov. 30-Dec. 3, 2010, 12 pages.

(56) References Cited

OTHER PUBLICATIONS

Church, et al., "Word Association Norms, Mutual Information, and Lexicography", Journal of Computational Linguistics, vol. 16, No. 1, Mar. 1990, 8 pages.
Cohen, et al., "Capturing, Indexing, Clustering, and Retrieving System History", Proceedings of the Twentieth ACM Symposium on Operating systems Principles, Oct. 23, 2005, 14 pages.
Cooley, et al., "Web Mining: Information and Pattern Discovery on the World Wide Web", Proceedings of the Ninth IEEE International Conference on Tools with Artificial Intelligence, Nov. 3, 1997, 10 pages.
Deerwester, et al., "Indexing by Latent Semantic Analysis", Journal of the American Society for Information Science, vol. 41, Issue 6, Sep. 1990, 17 pages.
Ellram, "Total Cost of Ownership: an Analysis Approach for Purchasing," Journal of PDLM, 1995, 12 pages.
Eppinger, "TCP Connections for P2P Apps: A Software Approach to Solving the NAT Problem," ISR, retrieved at <<http://reports-archive.adm.cs.cmu.edu/anon/isri2005/CMU-ISRI-05-104.pdf>>, 2005, 8 pages.
Feldmann et al., "IP Network Configuration for Intra-Domain Traffic Engineering," Network, IEEE, 2001, 27 pages.
Fielding, "Architectural Styles and the Design of Network-based Software Architectures", Doctoral Dissertation Architectural Styles and the Design of Network-based Software Architectures, Aug. 8, 2012, 180 pages.
Ford, et al., "Availability in Globally Distributed Storage Systems", Proceedings of OSDI, 2010, pp. 1-14, 14 pages.
Fruchterman, et al.; "Graph Drawing by Force—directed Placement", Software: Practice and Experience, vol. 21, No. 11, Nov. 1991, pp. 1129-1164, 36 pages.
Garrett, "Ajax: A New Approach to Web Applications", Retrieved at http://scholar.googleusercontent.com/scholar?q=cache:DY1KmbMV5IMJ:scholar.google.com/+Ajax:+A+new+approach+to+web+applications&hl=en&as_sdt=0,5>>, Feb. 18, 2005, 6 pages.
Feamster et al., "Detecting BGP Configuration Faults with Static Analysis," NSDI, 2005, 14 pages.
Goldstein, et al., "Summarizing Text Documents: Sentence Selection and Evaluation Metrics", Proceedings of the 22nd Annual International ACM SIGIR Conference on Research and Development in Information Retrieval, Aug. 15, 1999, 8 pages.
Goryachev, et al., "Implementation and evaluation of four different methods of negation detection," Tech. rep., DSG, 2006, 7 pages.
Goyal, et al., "Streaming for large scale NLP: Language modeling," Annual Conference of the Association for Computational Linguistics, 2009, 9 pages.
Greenberg et al., "A Clean Slate 4D Approach to Network Control and Management," Acm Sigcomm Ccr, 2005, retrieved at <<http://www.cs.cmu.edu/~4d/papers/greenberg-ccr05.pdf, 12 pages.
Greenberg, et al., "Towards a Next Generation Data Center Architecture: Scalability and Commoditization", Proceedings of the ACM Workshop on Programmable Routers for Extensible Services of Tomorrow, Aug. 22, 2008, pp. 57-62, 6 pages.
Greenberg et al., "VI2: A Scalable and Flexible Data Center Network," ACM Sigcomm CCR, 2009, retrieved at <<http://www.cs.cmu.edu/afs/.cs.cmu.edu/Web/People/prs/15-744-F11/papers/vI2.pdf, 12 pages.
Gruber, "Toward Principles for the Design of Ontologies Used for Knowledge Sharing", International Journal of Human-Computer Studies—Special Issue, Nov. 1995, 22 pages.
Gruschke, "Integrated Event Management: Event Correlation Using Dependency Graphs", Proceedings of the 9th IFIP/IEEE International Workshop on Distributed Systems: Operations & Management (DSOM 98), 1998, 12 pages.
Guo, et al "BCube: A High Performance, Server-Centric Network Architecture for Modular Data Centers," ACM Sigcomm CCR, 2009, retrieved at <<http://research.microsoft.com/pubs/81063/comm136-guo.pdf>>, 12 pages.

Guo, et al., "DCell: A Scalable and Fault-Tolerant Network Structure for Data Centers", Retrieved at <<http://research.microsoft.com/pubs/75988/dcell.pdf>>, Proceedings of the ACM SIGCOMM Conference on Data Communication, Aug. 17, 2008, pp. 75-86, 12 pages.
Gyarmati, et al., "Scafida: A Scale-Free Network Inspired Data Center Architecture", ACM SIGCOMM Computer Communication Review, vol. 40, Issue 5, Oct. 2010, pp. 4-12, 8 pages.
Hancock et al., "Next Steps in Signaling (NSIS): Framework," 2005, IETF RFC 4080, retrieved at<<http://cabernet.tools.ietf.org/pdf/rfc4080.pdf>>, 50 pages.
Greenhalgh et al., "Flow Processing and the Rise of Commodity Network Hardware," SIGCOMM CCR, 2009, 7 pages.
Handigol et al., "Where is the debugger for my software-defined network?" Proceedings of the first workshop on Hot topics in software defined networks, ACM, 2012, pp. 55-60, 6 pages.
Harris, "Data Center Outages Generate Big Losses," retrieved at <<http://www.informationweek.com/news/hardware/data_centers/229500121>>, May 2011, 9 pages.
Heafield, K., "Kenlm: Faster and smaller language model queries," Workshop on Statistical Machine Translation, 2011, 11 pages.
Heim, "Anaphora and Semantic Interpretation: A Reinterpretation of Reinhart's Approach", MIT Working Papers in Linguistics 25, 1998, pp. 205-246, 42 pages.
Hooimeijer, et al., "Modeling bug report quality," in IEEE/ACM International Conference on Automated Software Engineering, 2007, 10 pages.
Huang et al., "Diagnosing Network Disruptions with Network-Wide Analysis", Proceedings of the ACM SIGMETRICS International Conference on Measurement and Modeling of Computer Systems, Jun. 12, 2007, 12 pages.
Jonsson, et al., "Automated Bug Assignment: Ensemble-based Machine Learning in Large Scale Industrial Contexts", Proceedings of Empirical Software Engineering, retrieved on Apr. 29, 2015, 52 pages.
Joseph et al., "A Policy-aware Switching Layer for Data Centers," retrieved at <<http://ccr.sigcomm.org/drupal/files/p51-josephA.pdf>>, ACM Sigcomm CCR, 2008, 12 pages.
Jquery, Retrieved at<<http://jquery.com/>>, on Aug. 7, 2012, 1 page.
Just, et al., "Towards the next generation of bug tracking systems," IEEE Symposium on Visual Languages and Human-Centric Computing, 2008, 4 pages.
Justeson, et al., "Technical Terminology: Some Linguistic Properties and an Algorithm for Identification in Text", Natural Language Engineering, vol. 1, No. 1, 1995, pp. 9-27, 19 pages.
Kalchschmidt et al., "Inventory Management in a Multi-Echelon Spare Parts Supply Chain," Journal of Production Economics, 2003, retrieved at <<http://read.pudn.com/downloads142/sourcecode/others/617477/inventory%20supply%20chain/04051312322413213(1).pdf>>, 17 pages.
Kandula et al., "What's Going on? Learning Communication Rules in Edge Networks", Proceedings of the ACM SIGCOMM Conference on Data Communication, Aug. 17, 2008, 12 pages.
Kandula et al., "Detailed Diagnosis in Enterprise Networks," ACM Sigcomm CCR, 2009, retrieved at <<http://ccr.sigcomm.org/online/files/p243.pdf, 12 pages.
Kazemian et al., "Header Space Analysis: Static Checking for Networks," NSDI, 2012, 14 pages.
Kececioglu, "Maintainability, Availability, and Operational Readiness Engineering Handbook", vol. 1, DEStech Publications, Inc., 2002, pp. 24 and 27-29, 4 pages.
Khanna, et al., "Automated Rule-Based Diagnosis through a Distributed Monitor System", IEEE Transactions on Dependable and Secure Computing, vol. 4, Issue 4, Oct. 2007, pp. 266-279, 14 pages.
Kim, et al., "Floodless in Seattle: A scalable ethernet architecture for large enterprises", Proceedings of SIGCOMM, 2008, Aug. 17-22, 2008, 12 pages.
Kittur, et al., "Crowdsourcing user studies with mechanical turk," ACM SIGCHI Conference on Human Factors in Computing Systems, 2008, 4 pages.
Konig, et al., "Reducing the Human Overhead in Text Categorization", Proceedings of the 12th ACM SIGKDD International Conference on Knowledge Discovery and Data Mining, Aug. 20, 2006, 6 pages.

(56) References Cited

OTHER PUBLICATIONS

Labovitz et al., "Experimental Study of Internet Stability and Backbone Failures," Fault-Tolerant Computing, 1999, IEEE, retrieved at <<http://ieeexplore.ieee.org/stamp/stamp.jsp?tp=&arnumber=781062>>, 8 pages.

Lang, et al., "Enhancing Business Intelligence with Unstructured Data", Proceedings of Conference on Database Systems in Business, Technology and Web, Mar. 2, 2009, pp. 469-485, 17 pages.

Law et al., "An Integrated Case-Based Reasoning Approach for Intelligent Help Desk Fault Management", 1997, Expert Systems with Applications, vol. 13, No. 4, pp. 265-274, 10 pages.

Leland, et al., "On the Self-Similar Nature of Ethernet Traffic (extended version)," IEEE ToN, 1994, 15 pages.

Lilliefors, Hubert W., "On the Kolmogorov-Smirnov Test for Normality with Mean and Variance Unknown," JASA, 1967, 5 pages.

Lim, et al., "A Log Mining Approach to Failure Analysis of Enterprise Telephony Systems", IEEE International Conference on Dependable Systems and Networks with FTCS and DCC, Jun. 24, 2008, 6 pages.

Liu, et al., "F10: Fault-Tolerant Engineered Networks," NSDI, 2013, 14 pages.

Lockwood, "An Open Platform for Development of Network Processing Modules in Reprogrammable Hardware," IEC DesignConferemce '01, retrieved at <<http://algo-logic.com/~jwlockwd/publications/designcon2001_fpx_platform.pdf>>, 2001, 10 pages.

Loper et al., "NLTK: The Natural Language Toolkit", Proceedings of the Workshop on Effective Tools and Methodologies for Teaching Natural Language Processing and Computational Linguistics, May 17, 2002, 8 pages.

Mackay, "Information Theory, Inference, and Learning Algorithms", Book of Information Theory, Inference & Learning Algorithms, Oct. 6, 2003, 640 pages.

Mahimkar et al., "dFence: Transparent network-based denial of service mitigation," NSDI, 2007, 25 pages.

Mai et al., "Debugging the Data Plane with Anteater," SIGCOMM CCR, 2011, 12 pages.

Manber et al., "Suffix arrays: A New Method for on-Line String Searches", Retrieved at <<http://webglimpse.net/pubs/suffix.pdf>>, Proceedings of the First Annual ACM-SIAM Symposium on Discrete Algorithms, Jan. 22, 1990, 16 pages.

Mani, et al., "The Tipster Summac Text Summarization Evaluation", Proceedings of the Ninth Conference on European Chapter of the Association for Computational Linguistics, Jun. 8, 1999, 9 pages.

Johnson, "NOC Internal Integrated Trouble Ticket System," retrieved at <<http://tools.ietf.org/pdf/rfc1297.pdf, Jan. 1992, 13 pages.

Schroeder, et al., "Dram Errors in the Wild: A Large-Scale Field Study", Proceedings of SIGMETRICS, Jun. 15-19, 2009, 12 pages.

Seemakurty et al., "Word Sense Disambiguation via Human Computation", Proceedings of the ACM SIGKDD Workshop on Human Computation, Jul. 25, 2010, 4 pages.

Sekar et al., The Middlebox Manifesto: Enabling Innovation in Middlebox Deployment, Proc. HotNets, 2011, retrieved at <<http://www.cs.unc.edu/~reiter/papers/2011/HotNets.pdf>>, 6 pages.

Sekar et al., "Design and Implementation of a Consolidated Middlebox Architecture," NSDI, 2012, 14 pages.

Shaikh et al., "A Case Study of OSPF Behavior in a Large Enterprise Network," ACM Sigcomm WIM, 2002, retrieved at <<http://citeseerx.ist.psu.edu/viewdoc/download?doi=10.1.1.88.8850&rep=rep1&type=pdf>>, 14 pages.

"CodePlex, SharpNLP—Open Source Natural Language Processing Tools", retrieved at <<http://web.archive.org/web120120623043531/htt;://sharpnlp.codeplex.com/>>, Dec. 13, 2006, 2 pages.

Sherry et al., "Making Middleboxes Someone Else's Problem: Network Processing As a Cloud Service," SIGCOMM, Sep. 24, 2012, 12 pages.

Wang, et al., "MCube a High Performance and Fault-Tolerant Network Architecture for Data Centers", International Conference on Computer Design and Applications, Jun. 25, 2010, pp. 423-427, 5 pages.

Shokripour, et al., "Automatic Bug Assignment Using Information Extraction Methods", Proceedings of International Conference on Advanced Computer Science Applications and Technologies, Nov. 26, 2012, 6 pages.

Simm, et al., "Classification of Short Text Comments by Sentiment and Actionability for VoiceYourView", Proceedings of IEEE International Conference on Social Computing/IEEE International Conference on Privacy, Security, Risk and Trust, Aug. 20, 2010, pp. 552-557, 6 pages.

Singh, et al., "Dyswis: An Architecture for Automated Diagnosis of Networks", retrieved at <<http://www.cs.columbia.edu/~vs2140/DYSWIS.pdf>>, May 1-10, 2011, 8 pages.

Smadja, "Retrieving Collocations from Text Xtract," Journal of Computational Linguistics—Special Issue on Using Large Corporation, Mar. 1993, 35 pages.

Song, et al., "Availability Modeling and Analysis on High Performance Cluster Computing Systems", The First International Conference on Availability, Reliability and Security, Apr. 20, 2006, 8 pages.

Sorokin et al., "Utility Data Annotation with Amazon Mechanical Turk", IEEE Computer Society Conference on Computer Vision and Pattern Recognition Workshops, Jun. 23, 2008, 8 pages.

Spasic et al., "Text Mining and Ontologies in Biomedicine: Making Sense of Raw Text", Sep. 2005, Briefings in Bioinformatics, vol. 6, No. 3, pp. 239-251, 13 pages.

Srisuresh et al., "Middlebox Communication Architecture and Framework," RFC 3303, 2002, retrieved at <<http://www.ietf.org/rfc/rfc3303.txt>>, 32 pages.

Stiemerling et al., "Middlebox Communication (MIDCOM) Protocol Semantics," RFC 4097, 2008, retrieved at <<http://citeseerx.ist.psu.edu/viewdoc/download2doi=10.1.1.182.7835&rep=rep1&type=pdf>>, 70 pages.

Sukumaran, et al., "Integrating Structured and Unstructured Data Using Text Tagging and Annotation", In the Data Administration Newsletter, May 29, 2007, 6 pages.

Swale, et al., "Middlebox Communications Protocol Requirements," RFC 3304, 2002, retrieved at <<http://www.ietf.org/rfc/rfc3304.txt>>, 9 pages.

Tang, et al., "Analysis and Modeling of Correlated Failures in Multicomputer Systems", IEEE Transactions on Computers, vol. 41, No. 5, May 1992, 11 pages.

Thottan, et al., "Anomaly Detection in IP Networks", Proceedings of IEEE Transactions on Signal Processing, vol. 51, No. 8, Aug. 2003, pp. 2191-2204, 14 pages.

Toutanova et al., "Enriching the Knowledge Sources Used in a Maximum Entropy Part-of-Speech Tagger", Proceedings of the Joint SIGDAT Conference on Empirical Methods in Natural Language Processing and Very Large Corporation, Oct. 7, 2000, 8 pages.

Turner, et al., "California Fault Lines: Understanding the Causes and Impact of Network Failures," retrieved at http://cseweb.ucsd.edu/~snoeren/papers/cenic-sigcomm10.pdf, in ACM Sigcomm CCR, 2010, 12 pages.

Ukkonen, "On-Line Construction of Suffix Trees", Journal of Algorithmica, Sep. 1995, 18 pages.

Dixon, et al., "ETTM: A Scalable Fault Tolerant Network Manager," in NSDI, 2011, 14 pages.

Vishwanath, et al., "Characterizing Cloud Computing Hardware Reliability", Proceedings of Symposium on Cloud Computing (SOCC), Jun. 10-11, 2010, 11 pages.

Von Ahn, Luis, "Games with a Purpose", Retrieved at <<http://www.cs.cmu.edu/~biglou/ieee-gwap.pdf>>, in Computer, Volume, Jun. 2006, 3 pages.

Walfish, et al., "Middleboxes No Longer Considered Harmful," Procs. of SOSDI, USENIX Association, 2004, retrieved at http://www.usenix.org/event/osdi04/tech/full_papers/walfish/walfish.pdf>>, 16 pages.

Wang et al., "An Untold Story of Middleboxes in Cellular Networks," SIGCOMM, Aug. 15-19, 2011, Toronto, Ontario, Canada, 13 pages.

(56) References Cited

OTHER PUBLICATIONS

Watson et al., "Experiences with Monitoring OSPF on a Regional Service Provider Network," retrieved at <<http://www.eecs.umich.edu/techreports/cse/03/CSE-TR-477-03.pdf>>, ICDCS, IEEE, 2003, 12 pages.

Weight, "Allegiance: How Text Analytics Changes Everything", retrieved on Apr. 15, 2015, at <<https://www.allegiance.com/documents/text_analytics.pdf>>, 6 pages.

Welch, Terry A., "A Technique for High-Performance Data Compression", Computer, vol. 17, Issue 6, Jun. 1984, 12 pages.

Wu et al., "Open Information Extraction Using Wikipedia", Proceedings of the 48th Annual Meeting of the Association for Computational Linguistics, Jul. 11, 2010, 10 pages.

Wundsam, et al., "OFRewind: Enabling Record and Replay Troubleshooting for Networks", Proceedings: USENIX ATC'11 Proceedings of the 2011 USENIX conference on USENIX annual technical conference, Feb. 8, 2012, 14 pages.

Xu et al., "Detecting Large-Scale System Problems by Mining Console Logs", Proceedings of the ACM SIGOPS 22nd Symposium on Operating Systems Principles, Oct. 11, 2009, 16 pages.

Yamamoto et al., "Using Suffix Arrays to Compute Term Frequency and Document Frequency for All Substrings in a Corpus", Journal of Computational Linguistics, vol. 27, Issue 1, Mar. 2001, 30 pages.

Yamanishi et al., "Dynamic Syslog Mining for Network Failure Monitoring", Proceedings of the Eleventh ACM SIGKDD International Conference on Knowledge Discovery in Data Mining, Aug. 21, 2005, 10 pages.

Yuan et al., "SherLog: Error Diagnosis by Connecting Clues from Run-time Logs", Newsletter of ACM SIGARCH Computer Architecture News, vol. 38, Issue 1, Mar. 2010, 12 pages.

Zhang et al., "Extraction of Chinese Compound Words-An Experimental Study on a Very Large Corpus", Proceedings of the Second Workshop on Chinese Language Processing, Oct. 2000, 8 pages.

Ziefle, Martina, "Effects of Display Resolution on Visual Performance", Human Factors: The Journal of the Human Factors and Ergonomics Society, vol. 40, No. 4, 1998, pp. 554-568, 13 pages.

Mysore et al., "PortLand: A Scalable Fault-Tolerant Layer 2 Data Center Network Fabric", Retrieved at <<http://cseweb.ucsd.edu/~vahdat/papers/portland-sigcomm09.pdf>>, in Proceedings of Sigcomm CCR, ACM, 2009, 12 pages.

"SQL Server", Retrieved at <<http://www.microsoft.com/sqlserver/en/us/default.aspx>>, Aug. 8, 2012, 12 pages.

Gill, et al., "Understanding Network Failures in Data Centers: Measurement, Analysis, and Implications", Retrieved at <<http://research.microsoft.com/en-us/um/people/navendu/papers/sigcomm11netwiser.pdf>>, In Annual Conference of the ACM Special Interest Group on Data Communication, Aug. 15, 2011, pp. 12.

Wu, et al., "NetPilot: Automating Datacenter Network Failure Mitigation", Retrieved at <<http://www.cs.duke.edu/~xinwu/pubs/2012_sigcomm_netpilot.pdf>>, In Annual Conference of the ACM Special Interest Group on Data Communication, Aug. 13, 2012, pp. 12.

Notice of Allowance mailed Dec. 23, 2015 from U.S. Appl. No. 13/677,302, 42 pages.

Ellram et al., "Total Cost of Ownership: A Key Concept in Strategic Cost Management Decisions", Journal of Business Logistics, vol. 19, No. 1, 1998, pp. 55-84, 28 pages.

Response filed Sep. 22, 2015 to Non-Final Office Action mailed Jul. 17, 2015 from U.S. Appl. No. 13/861,857, 11 pages.

Notice of Allowance mailed Oct. 6, 2015 from U.S. Appl. No. 13/535,366, 6 pages.

Ellram, "Total Cost of Ownership: An Analysis Approach for Purchasing," PDLM International Journal of Physical Distribution & Logistics Management, vol. 25, No. 8, 1995, pp. 4-23, 24 pages.

Notice of Allowance mailed Nov. 3, 2015 from U.S. Appl. No. 13/536,782, 6 pages.

Supplemental Notice of Allowability mailed Nov. 19, 2015 from U.S. Appl. No. 13/535,366, 3 pages.

Notice of Intention to Grant Mailed Nov. 24, 2015 from European Patent Application No. 13802771.9, 53 pages.

Supplemental Notice of Allowability mailed Dec. 9, 2015 from U.S. Appl. No. 13/535,366, 3 pages.

Final Office Action mailed Dec. 1, 2015 from U.S. Appl. No. 13/861,857, 23 pages.

Voluntary Amendments filed Nov. 13, 2015 from China Patent Application No. 201380059928.0, 12 pages.

Response filed Feb. 2, 2016 to the Final Office Action mailed Dec. 1, 2015 from U.S. Appl. No. 13/861,857, 12 pages.

\* cited by examiner

Method 400

| | | |
|---|---|---|
| Data Center 102(1) | | 802 |
| Access Router 108(1) down | | |
| Traffic Before (MBps) | 1908.0650 | Status Closed 804 |
| Traffic During (MBps) | 0.0000 | Duration 9.25 |
| Estimated Loss (GB) | 1058.9761 | Inter-Device Redundancy Success |
| Property Impact | | 806 |

| Property Name | Device Type | Count |
|---|---|---|
| Application 116 | Firewall | 1 |
| Application 116 | Agg. Switches | 2 |
| Application 116 | Load Balancer | 1 |
| Application 116 | Top Of Rack Switches | 1 |

FIG. 8

NETWORK EVENT PROCESSING AND PRIORITIZATION

BACKGROUND

In many network contexts, it is important to maintain reliable, responsive communications with end users. In the case of an Internet Service Provider (ISP), connected clients may notice degraded service due to network device failures within the ISP network. In the case of a data center, an application may execute on one or more servers, and clients communicating with the application may notice degraded service due to network device failures within the data center. Traditionally, network operators or engineers have used device-generated events to debug and resolve network device failures.

However, often the number of device-generated events is too large for a human operator or engineer to practically analyze manually. Moreover, the information provided in the device-generated events does not necessarily lead directly to conclusions about how much impact the events have on end users. To address this issue, some automated techniques have evolved to help network operators and engineers recognize and respond to network failures more quickly. Unfortunately, existing techniques may not adequately prioritize failure events and this makes it more difficult for engineers and operators to quickly remedy network failures, particularly high-severity network failures which impact service performance, availability or security.

SUMMARY

The above listed example is intended to provide a quick reference to aid the reader and is not intended to define the scope of the concepts described herein.

This document relates to processing electronic data. One implementation is manifest as one or more computer-readable storage devices storing instructions which, when executed by one or more processing devices, cause the one or more processing devices to perform acts. The acts can include obtaining multiple events that are generated by network devices in a networking environment. The acts can also include processing the multiple events to identify a subset of impactful events from the multiple events. The subset of impactful events can have associated device-level impacts or link-level impacts of traffic loss or latency inflation. The acts can also include determining a device-level or link-level failure metric for individual impactful events in the identified subset of impactful events. The device-level or link-level failure metric can be determined based on the traffic loss or latency inflation associated with the individual impactful events. The acts can also include determining a redundancy-related failure metric for the individual impactful events. The redundancy-related failure metric can be associated with individual network devices or links in the networking environment that are configured to perform redundant failovers. The acts can also include prioritizing the individual impactful events according to at least the device-level or link-level failure metric and the redundancy-related failure metric.

Another implementation is manifest as a system that that can include an event analysis component and one or more processing devices configured to execute the event analysis component. The event analysis component can be configured to obtain multiple events that are generated by network devices in a networking environment. The event analysis component can also be configured to identify impactful events from the multiple events. The impactful events can have associated device-level or link-level impacts. The event analysis component can also be configured to determine one or more failure metrics for an individual impactful event. The one or more failure metrics can include at least a first redundancy-related failure metric associated with redundant failovers in the networking environment.

Another implementation is manifest as a technique that can include obtaining multiple events that are generated by network devices in a networking environment and identifying individual impactful events from the multiple events based on associated impacts to the networking environment or applications or services hosted thereon. The technique can also include prioritizing the individual impactful events using one or more policies having one or more criteria.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

FIGS. 7 and 8 show screenshots of graphical user interfaces that can be generated relative to certain concepts in accordance with some implementations.

DETAILED DESCRIPTION

Overview

Figure 1:
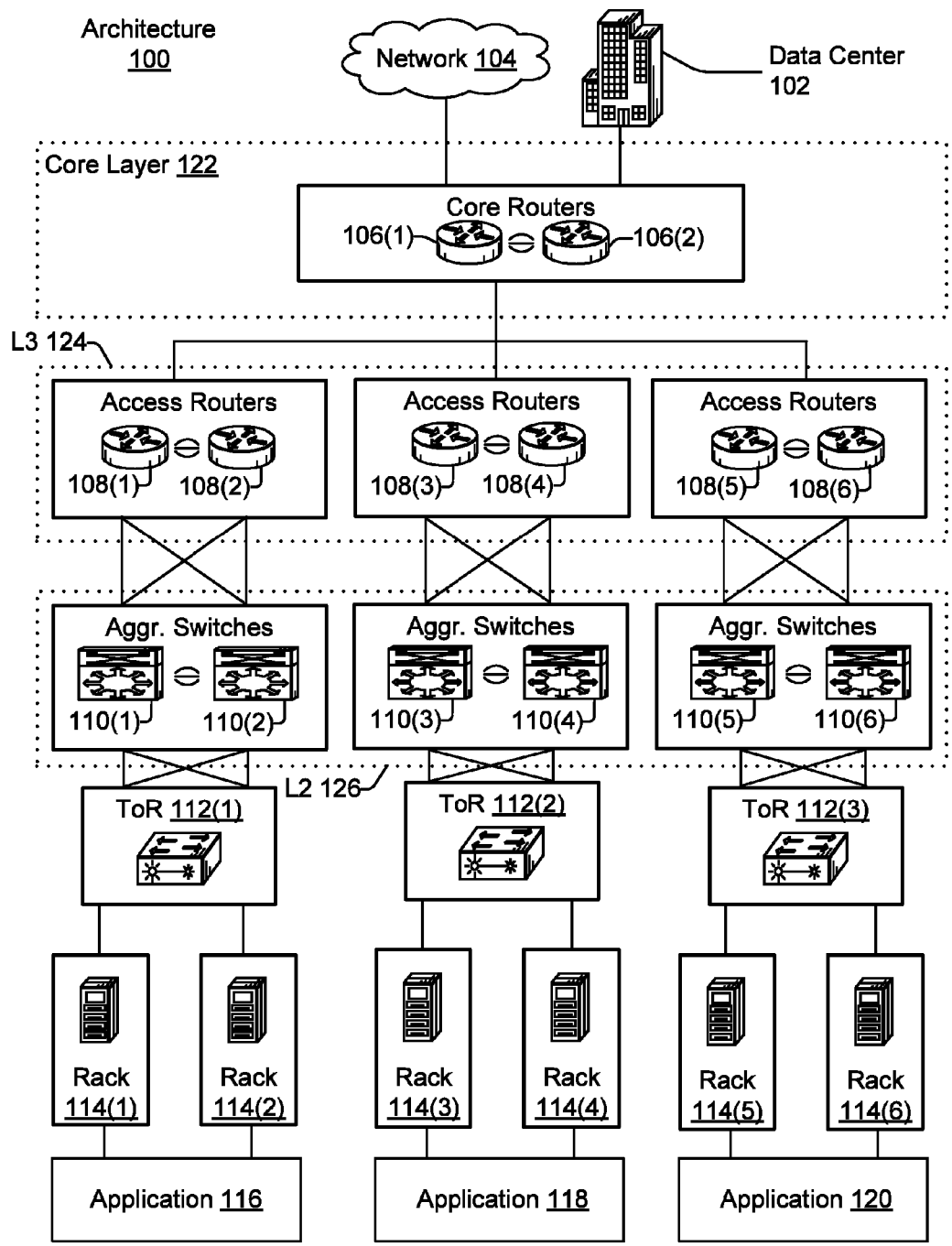
FIGS. 1 and 9 show exemplary data center architectures in which the present concepts can be employed.

This discussion relates to processing events on an electronic network. For example, various network devices can generate events that indicate status of the network devices or status of links between the network devices. Of these events, some will be indicative of significant network failures. However, the presence of such events is not necessarily indicative of an impactful problem in the network. For example, a network device or link may generate intermittent events that, taken individually, seem to suggest problems on the network device. However, if the network device or link does not seem to be dropping any packets or exhibiting substantial latency, these events do not indicate any kind of meaningful failure and can, in some cases, be ignored.

Even when a failure is impactful at the device or link level, e.g., the failure causes some dropped packets or increased latency at an individual network device or link, there may be circumstances where these impactful failures are mitigated from the perspective of the end user. For example, one way to mitigate device-level failures is to deploy network devices (or links) in redundancy groups. Generally, a redundancy group contains multiple member devices/links and individual member devices/links can perform the functionality of other member devices/links should they fail. The term "successful failover" indicates that a failure by a member of a redundancy group of devices or links has been successfully mitigated by one or more other members of the redundancy group. The term "unsuccessful failover" indicates that a failure by a member of a redundancy group of devices or links has not been successfully mitigated by the other members of the redundancy group.

Generally, the disclosed implementations can help network engineers or operators distinguish between failure events that are impactful at the device or link level and failure events that are relatively inconsequential at the device or link level. Furthermore, the disclosed implementations can rank or prioritize failure events with significant device-level impact based on whether available mitigation mechanisms, such as redundancy groups, can be expected to reduce service disruptions due to the device- or link-level failures. For example, consider two network devices that fail, where a first one of the network devices is part of a redundancy group and a second one of the network devices does not have a redundant backup. The disclosed implementations may tend to rank failure events associated with the second network device more highly than failure events associated with the first device, because failures of the first device are more likely to be masked by successful failovers. Analogous processing can be performed for failure events associated with particular links connecting various network devices.

To facilitate identifying and prioritizing impactful failures, failure metrics are provided that can be derived from device-generated events. Generally, the disclosed failure metrics include device-level or link-level metrics relating to traffic loss and/or latency inflation at individual network devices or links. The disclosed failure metrics also include redundancy related metrics that reflect whether individual redundancy failovers are successful and whether a given redundancy group can be expected to provide successful failovers on an ongoing basis. The redundancy-related metrics can be determined for individual devices and links that are redundantly configured. The disclosed failure metrics also include functional failure metrics that reflect whether traffic flow within a network violates predefined rules and/or potentially creates security issues.

Some of the present techniques can leverage event logs, which may include events that are logged by various devices. The events in the logs can include failure events indicating failure of one or more network devices in the data center. Event logs can be processed to identify which events, if any, have associated device-level impacts. Failure metrics can then be derived for the events with device-level or link-level impacts. The failure metrics can then be processed to prioritize or rank the events. For example, one or more policies can be applied to the events to prioritize the events. The policies can have criteria that are applied to the failure metrics to perform the prioritizing.

Data Center Example

FIG. 1 illustrates an example of a data center network architecture 100 in which the disclosed implementations can be employed. The architecture can be manifest in a data center 102 that is connected to a network 104, such as the Internet. In this case, the architecture 100 includes devices or components such as core routers 106(1) and 106(2), access routers 108(1)-108(6), aggregation switches 110(1)-110(6), top-of-rack (ToR) switches 112(1)-112(3), and server racks 114(1)-114(6). Each of the racks 114 can include one or more server devices that host applications shown in FIG. 1 as applications 116, 118, and 120. Note that different instances of the various devices in FIG. 1 are distinguished by parenthetical references, e.g., 112(1) refers to a different ToR switch than 112(2). When referring to multiple devices collectively, the parenthetical will not be used, e.g., ToRs 112 can refer to either or all of ToR 112(1), ToR 112(2), and ToR 112(3). Note also that architecture 100 can include various devices or components not shown in FIG. 1, e.g., various intrusion detection and prevention systems, virtual private networks (VPNs), firewalls, load balancers, etc.

From a logical standpoint, the architecture 100 can be organized into a hierarchy that includes a core layer 122, an L3 aggregation layer 124, and a L2 aggregation layer 126. This logical organization can be based on the functional separation of Layer-2 (e.g., trunking, VLANs, etc.) and Layer-3 (e.g., routing) responsibilities. The network devices shown in each layer of architecture 100 are typical of some implementations in which the present concepts can be employed. However, note that the present concepts can also be employed in various other network contexts, including non-hierarchical configurations or configurations with different hierarchies than discussed herein.

FIG. 1 shows access routers 108(1) and 108(2) deployed in a first redundancy group, access routers 108(3) and 108(4) deployed in a second redundancy group, and access routers 108(5) and 108(6) deployed in a third redundancy group. As discussed more below, this is done to provide redundancy at the L3 aggregation layer 124. Thus, if access router 108(1) fails, traffic can still pass between application 116 and network 104 as long access router 108(2) is still functioning. Similar reasoning applies to application 118 with respect to access routers 108(3) and 108(4), and to application 120 with respect to access routers 108(5) and 108(6).

In addition, FIG. 1 shows aggregation switches 110(1) and 110(2) deployed in first redundancy group at the L2 aggregation layer 126, aggregation switches 110(3) and 110(4) deployed in a second redundancy group at the L2 aggregation layer, and aggregation switches 110(5) and 110(6) deployed in a third redundancy group at the L2 layer. As discussed above with respect to the access routers, if aggregation switch 110(1) fails, traffic can still pass between application 116 and network 104 as long as aggregation switch 110(2) is still functioning. Similar reasoning applies to application 118 with respect to aggregation switches 110(3) and 110(4), and for application 120 with respect to aggregation switches 110(5) and 110(6).

More generally, in a redundancy group, the group contains multiple members and individual members can perform the switching/routing functions when other member(s) of the redundancy group fail. Note also that FIG. 1 illustrates core routers 106 in a redundant configuration. In addition, note that the examples above assume that a single functioning device can accommodate all traffic across the corresponding layer.

Generally speaking, redundancy groups can be deployed in various configurations, including "active-standby" configurations and "active-active" configurations. In active-standby configurations, one or more devices are active (e.g., carrying traffic) and one or more other devices are on standby (e.g., not carrying traffic) and can be activated to take over for a failing device. In active-active configurations, the devices in the group are active and, when a device in the group fails, traffic that would have otherwise been carried by the failing device can be carried by the remaining members of the group.

ToRs 112 (also known as host switches) connect the servers hosted by the racks 114 to a remainder of the architecture 100 via an internal data center network represented by connecting lines in FIG. 1. Host ports in these ToR switches are often 10/100/1000 Ethernet, with the uplinks being Gigabit Ethernet or 10GE ports. The ToRs can be connected upstream to aggregation switch 110. These aggregation switches can serve as an aggregation point for Layer-2 traffic and typically support high-speed technologies such as 10 Gigabit Ethernet to carry large amounts of traffic (e.g., data).

Traffic from an aggregation switch 110 can be forwarded to an access router 108. The access router can use Virtual Routing and Forwarding (VRF) to create a virtual, Layer-3 environment for each tenant. (A tenant is an application, such as a service, hosted on servers which use network devices for connectivity—route traffic from/to users or other services to/from its hosted servers.) Thus, FIG. 1 illustrates three tenants, applications 116, 118, and 120, although varying numbers of tenants can execute on individual servers of racks 114. In some implementations, the L3 aggregation layer 124 can aggregate traffic from up to several thousand servers and route the traffic to core routers 106 that can connect to the rest of the architecture 100 and network 104.

Some implementations (especially user-facing applications) may use load balancers to improve the performance of hosted applications. Redundant pairs of load balancers can connect to the aggregation switch 110 and perform mapping between static IP addresses (exposed to clients through DNS) and dynamic IP addresses of the servers to process user requests to applications 116, 118, and 120. Load balancers can support different functionalities such as network address translation, secure sockets layer or transport layer security acceleration, cookie management, and data caching.

Firewalls can be deployed in some implementations to protect applications from unwanted traffic (e.g., DoS attacks) by examining packet fields at IP (Internet Protocol) layer, transport layer, and sometimes even at the application layer against a set of defined rules. Generally, software-based firewalls can be attractive to quickly implement new features. However, hardware-based firewalls are often used in data centers to provide performance-critical features.

Virtual private networks (VPNs) can augment the data center network infrastructure by providing switching, optimization and security for web and client/server applications. The virtual private networks can provide secure remote access. For example, the virtual private networks can implement secure sockets layer, transport layer security, or other techniques.

Considering FIG. 1, note that there are several points of failure which could result in the unavailability of application 116. For example, application 116 could have a software failure, hardware failure, misconfiguration, protocol error, or other malfunction that causes application 116 to stop executing properly on the servers of racks 114. Additionally, failure of ToR 112(1) can result in unavailability of application 116, as can concurrent failure of both of the redundantly-configured core routers 106(1) and (2), both redundantly-configured access routers 108(1) and 108(2), and/or both redundantly-configured aggregation switches 110(1) and 110(2). Similar reasoning applies to application 118 and 120, as already mentioned above.

System Example

Figure 2:
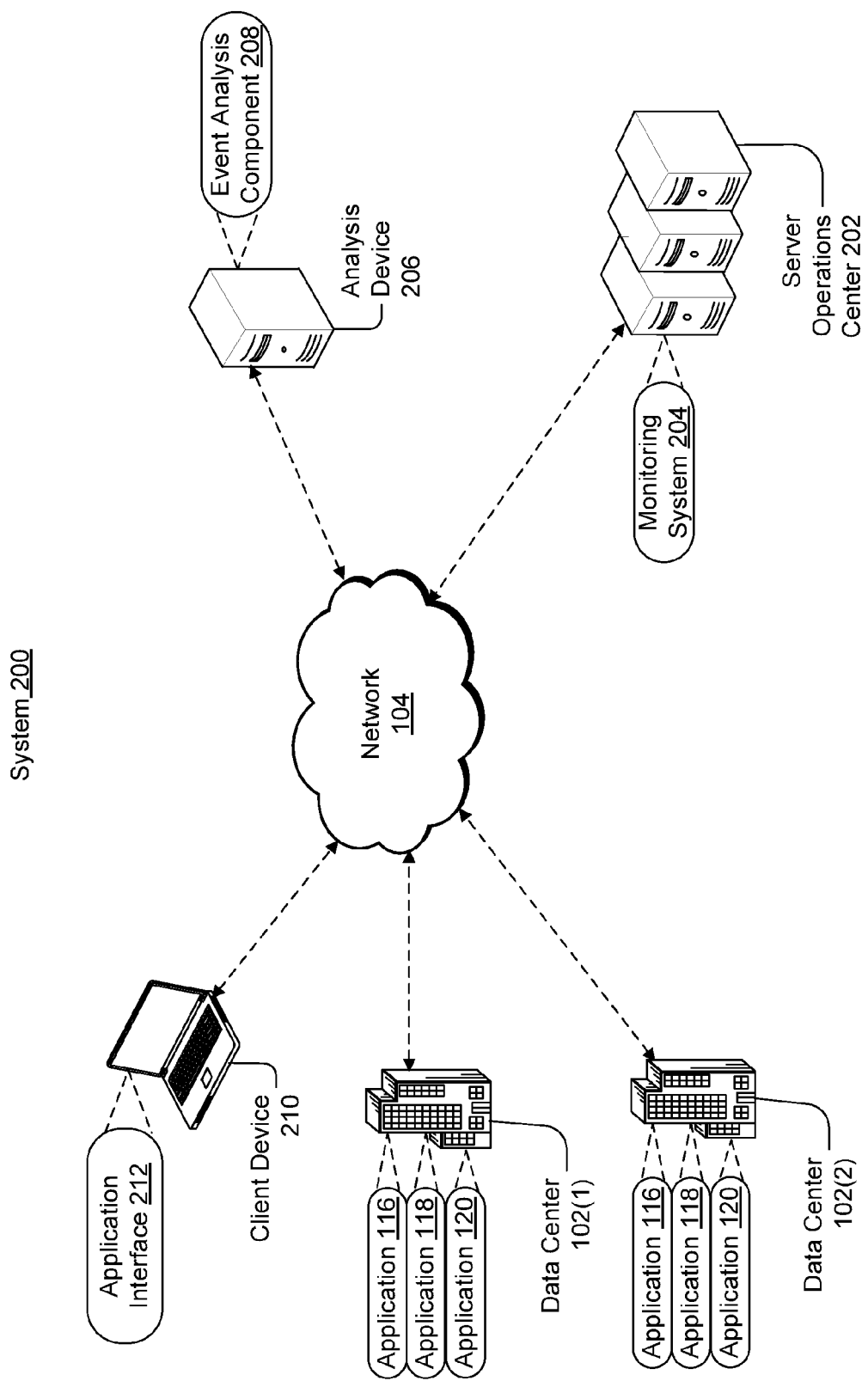
FIG. 2 shows an example system in which the present concepts can be employed.

FIG. 2 shows an exemplary system 200 that is consistent with the disclosed implementations. As shown in FIG. 2, system 200 includes network 104 connecting numerous entities, including a data center 102(1) and a data center 102(2), a server operations center 202 having a monitoring system 204, an analysis device 206 having an event analysis component 208, and a client device 210 having an application interface 212. Data centers 102(1) and 102(2) can be hierarchically configured in a manner such as shown in FIG. 1, although the data centers are not necessarily configured identically to each other. As shown in FIG. 1, both data centers host applications 116, 118, and 120.

Network 104 can include various wired and/or wireless networks and combinations thereof. For example, network 104 can include the public Internet as well as various private networks or portions thereof that connect any of the devices/data centers shown in FIG. 2. For the purposes of the following discussion, it is generally sufficient that network 104 provides connectivity between devices or data centers that share information.

Client device 210 can interact with application 116, 118, and/or 120 by communicating over network 104 with either data center 102(1) or data center 102(2), provided there is connectivity. Application interface 212 can include logic for communicating with application 116, 118, and/or 120 e.g., formatting functionality, display functionality, etc. For example, client device 210 can be employed by an end user that wishes to use various features made available by application 116, 118, and/or 120. In some cases, application interface 212 is a general purpose web browser, a dedicated client-side interface, etc.

Server operations center 202 can generally include one or more server devices configured to monitor the individual data centers for network problems. For example, monitoring system 204 can execute on the server devices to monitor data centers 102(1) and 102(2). In some implementations, network operators (e.g., network engineers) at server operations center 202 may attempt to resolve issues on either data center, and can track the issues using support tickets, diaries, or other techniques.

Event analysis component 208 of analysis device 206 can be configured to analyze various events in one or more data centers, e.g., device-generated events generated within data center 102(1), 102(2), or both. The analysis can include determining whether individual events are impactful at the device level. The analysis can also include determining the extent to which redundancy may mitigate problems caused by impactful device-level failures.

Note that the various devices shown in system 200 are illustrated with respect to logical roles that can be performed by the devices in operation of system 200. However, the geographical locations of the various devices are not necessarily reflected by system 200. For example, data centers 102(1) and/or 102(2) may be collocated with server operations center 202 and/or analysis device 206. As another example, the event analysis component 208 and/or monitoring system 204 can be implemented on one or more devices inside an individual data center, e.g., on one or more of server racks 114.

Furthermore, note that FIG. 2 illustrates server operations center 202 as multiple server devices whereas analysis device 206 and client device 210 are illustrated as individual computing devices. This reflects one particular implementation, and other implementations may provide characterization functionality and/or client functionality as discussed herein via multiple devices. Likewise, server operations center and/or data center functionality as discussed herein may be performed by individual devices.

In addition, functionality described herein with respect to a particular device or devices can be distributed across multiple devices or combined on a single device. For example, monitoring system 204 and event analysis component 208 can be collocated at a server operations center on a single device or multiple devices. As another example, the event analysis component and/or monitoring can be employed on a device at one or both data centers of system 200.

Further note that, in practice, there may be additional instances of each computing device mentioned herein, e.g., additional analysis devices, server operations centers, client devices, and data centers. As discussed in more detail below, each of the computing device(s) shown in FIG. 2 can include one or more processing devices, such as computer processors executing instructions stored on one or more computer-readable storage media such as volatile or non-volatile memories, optical disks, hard drives, flash drives, etc. Furthermore, the various computing devices can be configured to accept various forms of input, including gestures, touch screens, using voice recognition, etc.

Monitoring System

The monitoring system 204 on server operations center 202 can generally serve to obtain various data relating to the operation of data centers 102(1) and 102(2). The obtained data can be provided to event analysis component 208 for further processing, as discussed in more detail below. For example, the data obtained by the monitoring system can include device-generated events such as Simple Network Management Protocol (SNMP) events.

In some implementations, the monitoring system 204 can accept events directly from individual devices or from device log streams (e.g., from syslog). For example, the event logs can be obtained from, and include events generated by, network devices such as core routers 106, access routers 108, aggregation switches 110, and/or ToRs 112 as well as various other network devices (firewalls, load balancers, etc.). The events can contain information about what type of network component experienced an event, the event type, the other end-point of this component (e.g., the one-hop directly-connected neighbor), and a short machine-generated description of the event.

In some implementations, the monitoring system 204 can combine multiple device-generated events into a single logical event. For example, a given network device may generate identical or very similar events at a high rate for a given period of time, and the monitoring system may combine these events into a single logical event. Thus, the event analysis component 208 can operate on the combined logical events instead of processing the individual device-generated events. Unless otherwise specified herein, the term "event" can refer to either a device-generated event or a logical event that represents multiple device-generated events.

The monitoring system 204 on server operations center 202 can also obtain traffic data. For example, traffic carried on network interfaces (links) can be logged using Simple Network Management Protocol ("SNMP") polling that averages traffic seen every five minutes, for example. Other sources of traffic data can be obtained from sampling based approaches such as NetFlow® or sFlow®; the latter also captures the first few bytes, say 100 bytes, of each packet sampled from the traffic flows. Traffic monitoring systems can use the management information base (MIB) format to store the data that includes fields such as the interface type (token ring, Ethernet etc.), the other end of the interface (e.g., the one-hop directly connected neighbor), the interface status (up/-down), timestamp, and/or the number of bytes sent or received by the interface, among others.

Event Schema

In some implementations, the monitoring system 204 can map the device-generated events to a common schema, e.g., one or more device-generated events can be combined into a logical event that conforms to the common schema. Then, the monitoring system can forward the events that have been mapped to the common schema to the event analysis component 208 for further processing. Generally, a given data center may have multiple different types of network devices from different vendors, with different operating systems, etc. Thus, events generated by such network devices may be difficult to directly compare or analyze when in their "native" format, e.g., as generated by a given device. By mapping the events to a common schema, events that were originally generated in different native formats can be directly compared by the event analysis component.

One example schema is as follows: {Device Name, Notified At, Cleared At, Ticket ID, Device Type, Data Center, Property, Property Abbreviation}. Here, Device Name is the name of the device that generated the event, e.g., each device in a given data center may have a specific name used to distinguish that device from other devices in the network. Notified At may be the time when the event was initially generated by the device, and Cleared At may be the time when the event was eventually cleared, e.g., by replacing a hardware component with a spare, rebooting/replacing the device that generated the event, etc. Device Type may indicate the functional type of the device (e.g., access router, aggregation switch, etc.).

Data Center may identify the particular data center where the device that generated the event is located. Property may identify an application or service that could be affected by the event. In other words, Property may identify an application or service that communicates traffic through the device that generated the event, e.g., an event at aggregation switch 110(1) could have application 116 as the value for Property and an event at access router 108(5) could have application 120 as the value for Property. Property Abbreviation may be a shorthand notation for the potentially-affected service or application.

Specific Event Analysis Component Implementation

Figure 3:
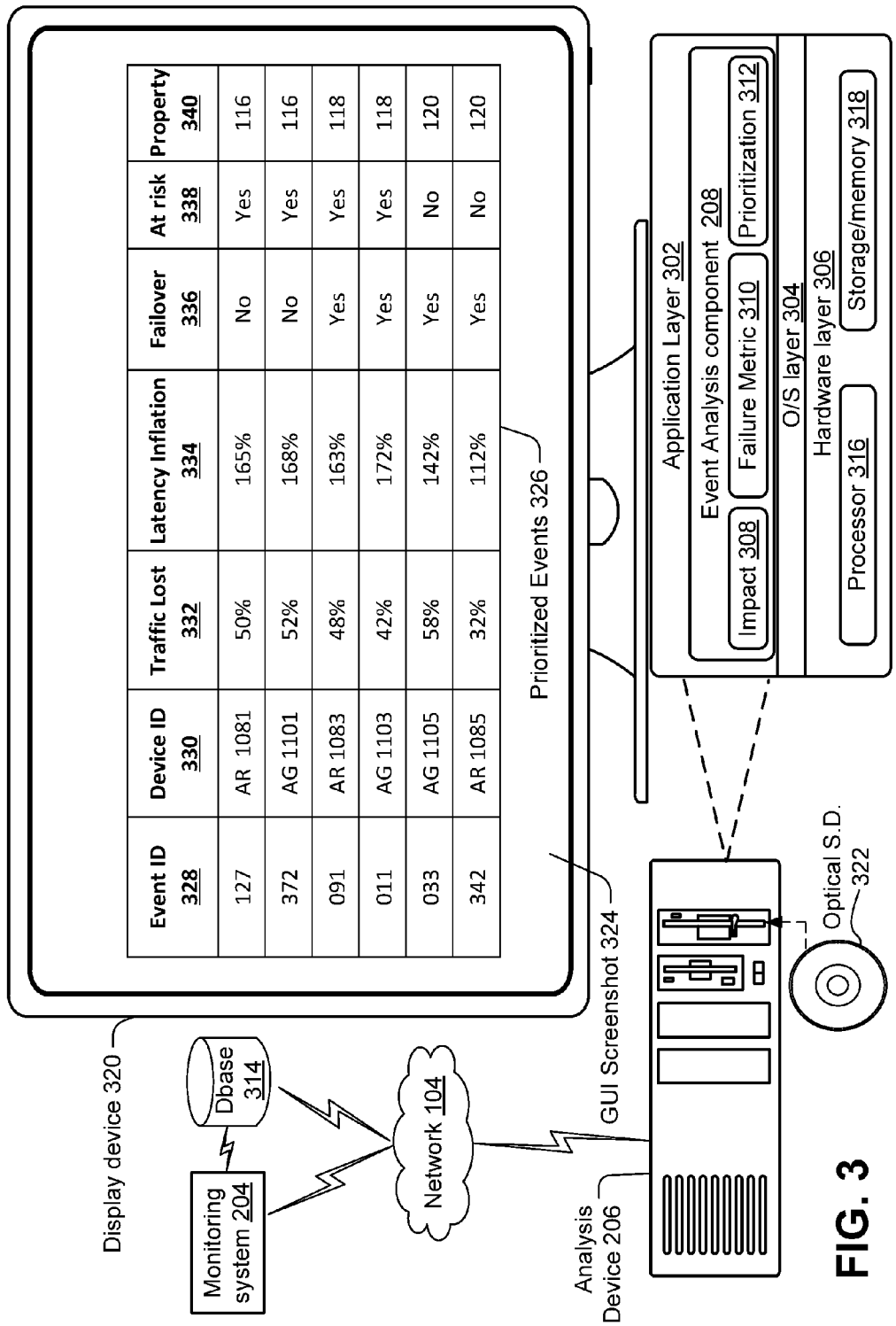
FIG. 3 shows an example computer or computing device that can be configured to accomplish certain concepts in accordance with some implementations.

FIG. 3 shows event analysis component 208 embodied on analysis device 206. The analysis device is one example of a system that can be configured to accomplish certain concepts, as discussed in more detail below. In this case, the analysis device is illustrated as a desktop computer. The terms "computer" or "computing device" are used interchangeably, and as used herein can mean any type of device that has some amount of processing capability. While specific examples of computers are illustrated for purposes of explanation, other examples of such computers can include traditional computing devices, such as personal computers, any of the devices introduced relative to FIGS. 1 and 2, cell phones, smart phones, personal digital assistants, tablets, or any of a myriad of ever-evolving or yet to be developed types of devices. Further, a system can be manifest on a single computing device or distributed over multiple computing devices.

In this case, analysis device 206 can include an application layer 302, an operating system layer 304, and a hardware layer 306. The event analysis component 208 can be manifest as a program or application of the application layer 302, among other configurations. In this example, the event analysis component can include an impact module 308, a failure metric module 310, and a prioritization module 312. The event analysis component can process events provided directly over network 104 by monitoring system 204. Alternatively, the monitoring system can populate a database 314 with events and the event analysis component can process the events in the database. As mentioned, the events received from the monitoring system (or populated in the database) can be logical events that are mapped to a common schema, and in some cases an individual logical event is a combined event representing multiple device-generated events. In other implementations, the event analysis component may operate directly on device-generated events without any such preprocessing.

The impact module 308 can receive events from the monitoring system 204 or database 314 and determine whether a given event has a device-level impact. For events with device-level (or link-level) impacts, the failure metric module 310 can determine one or more failure metrics. The prioritization module 312 can prioritize or rank different events based on the failure metrics. For example, the prioritization module may apply one or more policies to the failure metrics to perform the ranking, as discussed more below.

The hardware layer 306 can include a processor 316, storage/memory (e.g., one or more computer-readable storage media) 318, a display device 320, and/or various other elements. For instance, the other elements can include input/output devices, optical disc readers, USB ports, etc. Processor 316 can execute computer-readable instructions to provide functionality, such as event analysis component functionality. Data and/or computer-readable instructions can be stored on storage/memory 318 and/or received from another source, such as optical storage device 322. The storage/memory 318 can include any one or more of volatile or non-volatile memory devices, hard drive storage devices, flash storage devices (e.g., memory sticks or memory cards), and/or optical storage devices (e.g., CDs, DVDs, etc.), among others.

Alternatively to the illustrated configuration of analysis device 206, the analysis can employ a system on a chip (SOC) type design. In such a case, functionality provided by the analysis device can be integrated on a single SOC or multiple coupled SOCs. For instance, the computer can include shared resources and dedicated resources. An interface(s) can facilitate communication between the shared resources and the dedicated resources. As the name implies, dedicated resources can be thought of as including individual portions that are dedicated to achieving specific functionalities. Shared resources can be storage, processing units, etc., that can be used by multiple functionalities.

Generally, any of the functions described herein can be implemented using software, firmware, hardware (e.g., fixed-logic circuitry), manual processing, or a combination of these implementations. The term "engine," "tool," "component," or "module" as used herein generally represent software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable storage/memory devices, such as computer-readable storage media. The features and techniques of the component are platform-independent, meaning that they may be implemented on a variety of commercial computing platforms having a variety of processing configurations.

As used herein, the term "computer-readable media" and "computer-readable medium" can include signals and hardware. In contrast, the terms "computer-readable storage media" and "computer-readable storage medium" exclude pure signals. Computer-readable storage media can include "computer-readable storage devices." Examples of computer-readable storage devices include volatile storage media, such as RAM, and non-volatile storage media, such as hard drives, optical discs, and flash memory, among others.

In the example of FIG. 3, the event analysis component 208 can generate GUI screenshot 324 by obtaining events from monitoring system 204 and/or database 314. As mentioned, database 314 can be populated by the monitoring system and can include events from one or more devices in one or more data centers. GUI screenshot 324 shows prioritized events 326 listed in the prioritized order as determined by the event analysis component.

Example Failure Metrics

Each event listed in GUI screenshot 324 can include information such as an event ID 328, device ID 330, failure metrics 332, 334, 336, and 338, and event property 340. In some implementations, event ID can be an identifier that uniquely identifies each logical event provided to the event analysis component 208 by the monitoring system 204, e.g., a monotonically increasing event ID. Device ID 330 identifies the particular device that generated the event, e.g., event ID was 127 is shown as associated with device ID AR 1081, chosen for notational convenience to represent access router 108(1) as shown in FIG. 1. Also, note that events may be referred to herein as "event 127," "event 372," etc., when referencing the event associated with a particular event ID. Event property 340 can identify an application or service that is potentially impacted by a given event, e.g., an application or service hosted on one or more servers within the subtree of the device that generated the event. Note that the information shown in GUI screenshot 324 is exemplary, and can include other information such as identifying specific links that have failed, other information from the event schema discussed above, other failure metrics discussed herein, etc.

The failure metrics shown in FIG. 3 include a traffic lost metric 332, a latency inflation metric 334, a failover metric 336, and an at-risk redundancy metric 338. Traffic lost metric 332 can be a device-level metric that indicates whether a given device lost any traffic, e.g., the value of 50% shown for event 127 indicates that the traffic through AR 108(1) dropped by 50% after event 127. In other words, the traffic lost failure metric represents a ratio of traffic at the device after the event to the traffic at the device before the event. Alternatively, as shown below with respect to FIG. 10, the traffic lost failure metric can represent a volume of traffic lost as a result of the event, e.g., (traffic_before_event−traffic_during_event)*event duration, e.g., in bytes/octets per second. Note that the traffic lost metric can also be computed at the link layer as well, e.g., traffic lost over a particular link that connects network devices to one another.

Latency inflation metric 334 can be another device-level metric that indicates whether a given device had an increase in latency associated with a given event. For example, the latency inflation metric can be represented as a percentage of the device latency before an event to the device latency after an event. Often, latency inflations are a result of queuing delays on a given device due to buffers getting increasingly full after the event takes place. Other reasons for latency inflation can include faults in the traffic routing and switching plane cards inside the device (e.g., supervisor engine in Access routers and Aggregation switches from Cisco®) where one or more of these cards may fail or not be completely operational. Note that the latency inflation metric can also be computed at the link layer as well, e.g., latency inflation on a particular link that connects network devices to one another.

Failover metric 336 and at-risk redundancy metric 338 can be considered redundancy-related metrics in the sense that each of these metrics relates to the efficacy of redundancy at handling failure events. Failover metric 336 and at-risk redundancy metric 338 can be computed on a device layer and/or link layer for each impactful event. Failover metric 336 indicates whether a redundancy failover successfully took place after the event. For event ID 127, the failover value of "No" indicates that the failover was not successful, e.g., access router 108(2) did not successfully handle the failure by access router 108(1). For event 091, the failover value of "Yes" indicates that the failover was successful, e.g., access router 108(4) was successfully able to handle the failure by access router 108(3). Generally, failover can be considered successful if the total volume of traffic through a given redundancy group of devices or links does not change as a result of the failure. In other words, traffic has been rerouted from the failed device to another device without losing traffic. Note that the failed device may cause retransmissions (e.g., TCP retransmission) to other devices in the redundancy group, but as long as these retransmissions succeed the failover can generally be considered successful.

Note also that some implementations may use the failover metric 336 on a link level. For example, one link on a device may fail but another link on the same or another device maybe be redundantly configured to handle traffic for the failing link. If this link-to-link failover is successful, the failover metric can have a value of "Yes" and can otherwise have a value of "No." Unless link failovers are expressly mentioned, however, references herein to the failover metric refer to device failovers within a redundant group of devices.

At-risk redundancy metric 338 also relates to redundancy, but indicates whether a redundancy group of devices or links that successfully handled a failover is at risk of not being able to handle subsequent failover attempts. For example, the at-risk redundancy metric may indicate whether the device that successfully handles a failover is operating as a single point of failure, e.g., is the last device remaining operational device in a redundant group. For event ID 091, the failure of access router 108(3) leaves only access router 108(4) to handle any traffic to/from application 118. Thus, access router 108(4) is operating as a single point of failure in this instance, and the at-risk redundancy metric has a value of "Yes." If there were a third member of the redundancy group and two of the devices were still operational, then the value of at-risk redundancy metric would be "No" because there would be two remaining redundant devices to handle the failure by access router 108(3).

Note also that links connecting a redundant device to another device can also be single points of failures. Thus, in some cases, the at-risk redundancy metric reflects whether a given link is acting as a single point of failure or if another link is available in the event a failure occurs. Unless link failovers are expressly mentioned, however, references herein to the at-risk redundancy metric refer to redundant groups of devices.

Example Method

Figure 4:
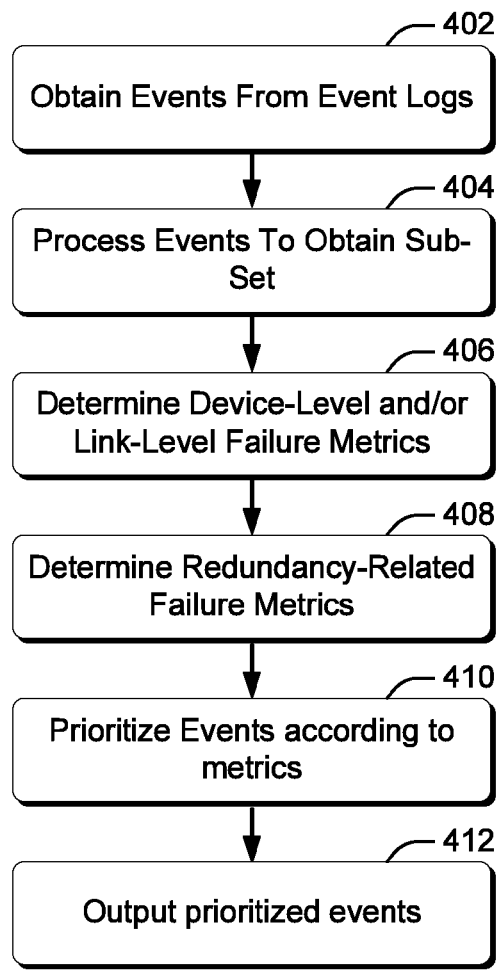
FIGS. 4 and 5 are flowcharts for accomplishing certain concepts in accordance with some implementations.

As mentioned above, some implementations may prioritize events based on associated failure metrics. FIG. 4 shows a method 400 that can be applied in this context. For example, method 400 can be performed by event analysis component 208 to prioritize various events.

At block 402, the method can obtain a set of events logged at one or more data centers or other network locations. In some implementations, the set of events can be obtained from a data center monitoring system or from a database that stores the set of events on behalf of the data center monitoring system. As discussed above, in some implementations the events can be logical events corresponding to multiple device-generated events that have been combined by the monitoring system and mapped to a common schema for further processing.

At block 404, the method can process the events to identify a subset of impactful events. For example, the method can filter the events by separating spurious and duplicate events to obtain a filtered subset of events that have some impact on a device, link, application, or service. For example, the subset of impactful events can include events associated with traffic loss, latency inflation, CPU or memory utilization, number of connections, improper routing of data to/from of an application or service, etc. As discussed more below, the separating can be accomplished by applying a pipeline of event filters to the set of events to generate the filtered subset of the events. In some cases, the pipeline can be created by selecting individual filters from a set of available event filters. The individual event filters may each apply different criteria to filter different events to create the filtered subset. Other implementations may use other techniques to identify the subset of impactful events, e.g., by analyzing correlations between event characteristics and event impacts.

At block 406, the method can determine one or more device-level and/or link-level failure metrics for each event in the subset. For example, the device-level failure metrics can reflect traffic loss across individual network devices, latency increases across individual network devices, etc. Likewise, the link-level failure metrics can reflect traffic loss/latency increases across individual links.

At block 408, the method can determine one or more redundancy-related failure metrics for each event in the subset. For example, the redundancy-level failure metrics can reflect whether a successful failover occurs in a redundancy group of devices or links, whether the redundancy group is likely to continue to failover successfully, etc.

At block 410, the events can be prioritized according to various criteria. For example, the criteria can be included in one or more policies that are applied in a cascaded fashion so that relatively high-priority events are identified by earlier-applied policies. The criteria in the policies can be based on the failure metrics, e.g., a given policy may have a first criterion for a device-level failure metric and a second criterion for a redundancy-level failure metric. Criteria can also relate to link-level metrics as well.

At block 412, the prioritized events can be output for automated processing, generating of various user interfaces, etc. Several example visualizations that can be used to convey prioritized events are discussed below.

Identifying Impactful Events

Figure 5:
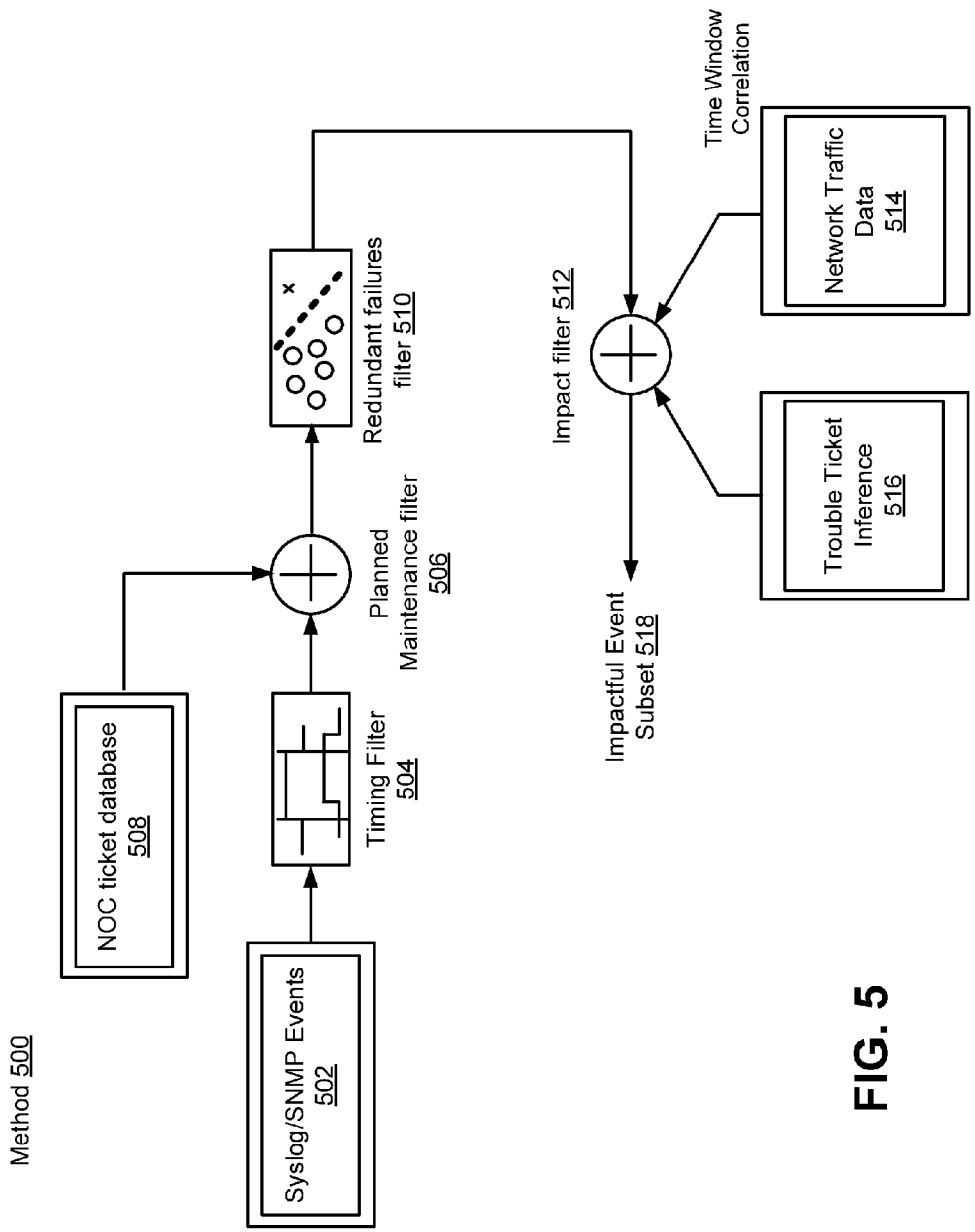

As mentioned above, some implementations employ filtering of events to obtain impactful events, e.g., events that are more than mere noise and that have some device-level, link-level, or application-level impact. FIG. 5 shows a filtering method 500 for separating a subset of impactful events from less informative events from a set. This method can utilize events from various sources. Generally speaking, method 500 can be viewed as one way to implement block 404 of method 400 discussed above.

In some implementations, the events can be manifest as Syslog/SNMP events 502 and can be filtered using a timing filter 504 that filters events using timing-related criteria. The timing filter can be used to fix various timing inconsistencies. In some implementations, the timing filter can first group events with the same start and end time originating on the same interface into a single event. This process can remove duplicate events.

Next, the timing filter 504 can pick the earliest start and end times of multiple events that originated within a predefined time window on the same interface. For example, any events that happened within a predefined time of 60 seconds on the same interface can be grouped into a single event (e.g., characterized as a single event). This process can reduce or avoid any problems due to clock synchronization and log buffering. The timing filter can also be used to group two events using interface criteria, e.g., by identifying events that originate on the same interface. For example, events that have the same start time but different end times can be grouped into a single event that is assigned the earlier of the end times. The earliest end times can be utilized since events may not be marked as cleared long after their resolution.

The technique can employ a planned maintenance filter 506 that applies planned maintenance criteria to filter events due to planned maintenance. Events caused by planned maintenance can have less value in understanding device behavior than unplanned events (e.g., unexpected outages). Thus, the planned maintenance filter can remove events that are caused by planned maintenance activities. In some implementations, tickets from a network operations center ("NOC") ticket database 508 can be used to determine whether maintenance is planned for a given device to detect whether a given event is caused by planned maintenance. In other implementations, network change notification systems or maintenance notification systems that track prior, current, and scheduled network changes and upgrades can be employed to detect events caused by planned maintenance.

The technique can employ a redundant failures filter 510. The redundant failures filter can apply redundant event criteria to filter events logged by devices that are scheduled for replacement or that have been detected as faulty by operators but are awaiting repairs. The redundant failures filter can identify these redundant events by arranging the devices in a list in descending order of their number of failures. In one implementation, for the top-k or the top percentage (e.g., 5%) of the devices in this list, all events are merged that have the same "NOC TicketID" field. This constitutes a merged event reflecting individual events with the same ticket ID that are likely to have the same symptoms.

The technique can employ an impact filter 512 that applies impact criteria to filter events. An event can be defined as having an impact when the event affects application reliability e.g., throughput loss, number of failed connections, or increased latency. In implementations without access to application-level logs, failure impact can be estimated by leveraging network traffic data 514 and computing the ratio of the median traffic on a failed device/link during a failure and its value in the recent past. For example, the value of the recent past can be set as the preceding eight-hour (or other duration) time correlation window. Other implementations can use other values. A failure can be considered to have an impact if this ratio is less than one, or another threshold on the ratio can be used (e.g., if traffic drops 10% within the time correlation window).

The impact filter 512 can also employ trouble ticket inference 516 to determine whether a trouble ticket is associated with a given event. If a trouble ticket associated with the event is present in NOC ticket database 508, it is likely that the event has an impact. Likewise, if the event does not have an associated trouble ticket, it is likely that the event does not have an impact. Thus, in some implementations, impact filter 512 can filter out events that do not have associated trouble tickets.

The above acts can collectively allow method 500 to identify the impactful event subset 518. Note that other filters can alternatively or additionally be utilized. For example, some implementations may employ filtering based on whether a given event impacts CPU and/or memory utilization of a given network device, number of connections (e.g., for a load balancer), filtering based on whether a recent configuration change may have caused the event, etc. Furthermore, one or more of the aforementioned filters may be omitted, and/or the filtering may be performed in a different order than that shown in FIG. 5, etc.

Also, note that various techniques can be used to correlate network-related data such as trouble tickets, traffic data, device configurations, performance counters, etc., without (or in addition to) the specific filtering implementations shown above. For example, method 500 can include selecting individual events associated with particular values for performance counters, e.g., CPU utilization counters. If a given event is associated with a network device CPU reaching 95% CPU utilization, this can be considered a device-level impact that may not exhibit traffic loss or latency symptoms. Note that such events may be considered impactful and thus included in the impactful event subset 518. Also note that other performance counters can be applied in a similar fashion, e.g., memory utilization, cache utilization, etc.

Another example of events that may be selected for the impactful event subset 518 is events associated with a particular device configuration change. For example, a configuration change to the network could involve a modification to an access control list that causes one or more network devices to block traffic coming from a particular IP address or range of addresses. In this case, an affected device might produce an event that specifically identifies the configuration change. Alternatively, the configuration change can be detected by monitoring symptoms of the configuration change, e.g., packets from a particular IP address or range of addresses being dropped. Note that impactful events can also be identified for other types of configuration changes, e.g., a new web page that causes a data center to receive great deal of new traffic within a certain IP address range.

Traffic Loss Metric

As mentioned, one metric that can be used for characterizing and prioritizing the impactful events in the impactful event subset 518 is a traffic loss metric. In some implementations, traffic loss can be expressed as a percentage. Several equations can be used to obtain traffic loss over a given device or link. For example, the estimated average of median traffic loss per event for a device can be defined as:

$$\frac{\sum_{\forall \text{ events}} ((\text{traffic} \cdot \text{before}_{median} - \text{traffic} \cdot \text{after}_{median}) * \text{Failure Duration})}{\text{Total Events Contributed By Device}}$$

Here, the equation implies that the estimated average of median traffic loss of a given device per event can be represented by the sum, over all events, of the difference in median network traffic before and after an event multiplied by the duration of the failure, divided by the total events contributed by the device to normalize the loss on a per-event basis. To obtain this value, the median traffic before and after each event can be computed to determine the median traffic loss, and then the median traffic loss can be averaged for a given event. Note that, in this context, the term "event" can refer to any individual failure episode, and can refer to a single or multiple individual device and/or link failures that collectively relate to the event.

The estimated median traffic loss for a given device per day d can be defined as:

$$\sum_{\forall \text{ events} \in d} ((\text{traffic} \cdot \text{before}_{median} - \text{traffic} \cdot \text{after}_{median}) * \text{Failure Duration})$$

Here, the equation implies that the loss for the device in a day is the sum, for each event associated with that device on that day, of the difference in median traffic before and after the event multiplied by the duration of the failure. Note also that traffic flow can be aggregated (e.g., summed) across links or devices in a redundant group.

For a given device model, the percentage of traffic lost by that device model can be computed as:

$$\frac{\text{Traffic Lost}}{\text{Traffic Carried}} * 100 = \frac{\text{Traffic Lost}}{\text{Throughput} * \text{Time}} * 100$$

where throughput is packets per second or bytes per second and Time is the total duration over which the calculation is performed. Traffic Lost and Traffic Carried can be computed as the sum of traffic lost/carried over each interface of a given device. The traffic over an interface can be computed as the sum of incoming and outgoing traffic, computed as a number of packets per second, bytes per second, etc.

Latency Inflation Metric

As mentioned, one metric that can be used for characterizing and prioritizing events is a latency inflation metric. Latency inflation can be due to buffering of packets in an individual device or link, due to sustained high load, bursty transient load, or an interface on a given device exhibiting intermittent connectivity, etc. In some implementations, latency inflation can be expressed as a percentage, e.g., an amount of latency for a given device or link has changed since a given event. For example, a device may be averaging 15 milliseconds of latency and the latency may double to 30 milliseconds (e.g., the ratio of the new latency to the old latency), so the latency inflation metric in this case would be 200%. To determine device latency, implementations may periodically poll different network devices and maintain latency statistics for each device.

Redundancy Failover Metric

As mentioned, one metric that can be used for characterizing and prioritizing events is a redundancy failover metric indicating whether a failover within a redundant group of devices or links is successful. In some implementations, redundancy failover can be expressed as a Boolean value, e.g., a 1 indicating that redundancy failover was successful and a 0 indicating the failover was not successful. For example, the aggregate traffic across a given redundant group of devices can be monitored. If the aggregate traffic across the redundant group after the event is sufficiently lower than the aggregate traffic before the event, then the failover can be considered to have failed. Otherwise, the failover can be considered to have succeeded. Note that, in this context, the aggregate traffic loss can be evaluated for statistical significance to determine whether the loss is caused by a given event, or simply due to fluctuations in demand for a given application/service.

Further implementations may use quantitative values to represent failover success. For example, the percentage of the aggregate traffic after the event relative to the aggregate traffic before the event can be used as the redundancy failover metric instead of a Boolean value. Consider a first event on a first device where the aggregate traffic flow across a device is reduced to 90% of the pre-event traffic, and a second event on a second device where the aggregate flow across the device is reduced to 10% of the pre-event traffic. Other things being equal, the second event may be prioritized higher than the first event because the traffic loss percentage is much greater.

At-Risk Redundancy Metric

As mentioned, one metric that can be used for characterizing and prioritizing events is an at-risk redundancy metric. This metric can indicate whether a future failover within a redundant group of devices or links is at risk of failing, e.g., because a given device or link is operating as a single point of failure. In some implementations, at-risk redundancy can be expressed as a Boolean value that indicates whether a redundant device group is at risk of future unsuccessful failovers. In one example, the value of the at-risk redundancy metric is "0" if there are at least two remaining operational devices in a redundancy group, or "1" if there is one or fewer remaining operational devices in the redundancy group. In this case, the at-risk redundancy metric simply reflects whether the redundancy group is acting as a single point of failure. Analogously, the value of the at-risk redundancy metric can be 0 when there are at least two remaining operational links in a redundancy group, or 1 if there is only a single link remaining in the redundancy group.

Further implementations may consider the extent to which redundancy groups with multiple functioning devices/links can still be at risk. For example, some redundantly-configured devices may exhibit some statistical correlation in their failures, as determined experimentally or by observation of deployed devices. Consider a first pair of redundant access routers that tends to fail together due to problems common to both of the access routers. For example, both access routers may be of a first device model that has some characteristic that causes the access routers to fail together, e.g., a bug in the software/firmware, sensitivity to power outages, power spikes, overload conditions, etc. In contrast, consider a second pair of access routers (e.g., of a different model) that is much less likely to fail together.

Under these circumstances, it may be useful to treat the first pair of redundant devices as "risky" because the failures of the devices are correlated. Conversely, it may be useful to treat the second pair of devices as "not risky" because the devices do not tend to fail together. Some implementations may compute the correlation (e.g., Pearson correlation, Spearman's rank correlation coefficient, and/or Kendall tau rank correlation coefficient) between tickets, outage minutes, or traffic loss for devices within an individual redundancy group. The at-risk redundancy metric can then be derived from the computed correlations. For example, the correlations can be compared to a threshold, and devices having a correlation exceeding the threshold can be identified as risky because these devices may tend to fail together (e.g., failures with a temporal relationship such as overlapping failures or tending to fail in succession).

Considering total outage time, one way to correlate outage time between two devices is as follows. First, the total downtime of a device A and the total downtime of a device B are determined from filtered events, as discussed above. Next, the filtered events are also used to determine individual events where both device A and B were down together, or at least partially overlapping in terms of their time window of being unavailable. If there is a strong negative correlation between failures of devices A and B (e.g., Pearson coefficient close to −1), then the overlapping failures will tend to be relatively minimal relative to the individual failure rates of the device. Said differently, the devices are less likely to fail together than would be the case if there were no correlation. If there is minimal or no correlation (e.g., Pearson coefficient of approximately 0), then the devices tend to fail independently of one another, e.g., the failure of one device has little or no apparent impact on whether the other device fails. If there is a strong correlation (e.g., Pearson coefficient close to 1), there is a strong correlation and the devices are more likely to fail together than would be the case if the failures were independent.

This last case, relatively high correlation, can be problematic for devices in a redundant configuration for reasons already mentioned. Similar processing can be employed with respect to network tickets by determining the Pearson coefficient for support tickets, e.g., determining the total number of tickets for each individual device and the intersection of these tickets that relate to both devices. Assuming an equivalent number of tickets, smaller intersections imply lower correlations and larger intersections imply higher correlations. Correlations can also be determined for losses of network traffic by individual devices, e.g., if traffic loss by one device in a redundant pair tends to be highly correlated to traffic loss by another device in the redundant pair, the pair can be flagged as a risky device pair.

Note that another way to show correlation of redundant device failures is the fraction or percentage of time (over a time window e.g., month, year) when all devices are down, e.g., this fraction is 10% when both devices in a redundant pair are down at the same time for 3 days in a 30-day month. Individual devices may be down for more than 10% of the month (e.g., 20% each), but their overlapping downtime is 10% in a month. One simple example is that device A is down the first four days of a week and a device B is down the last four days of a week. Here, their individual downtime percentage is 4/7*100, but the correlated downtime percentage is 1/7*100.

Further Metrics

Note that the concepts discussed herein are not limited to the aforementioned failure metrics. For example, the concepts discussed herein can readily be implemented by omitting, replacing, or adding to the aforementioned failure metrics. In addition, as already mentioned, the specific representations of the metrics discussed herein (e.g., Boolean values or percentages) can also be adapted to different data types or other alternative representations.

One specific example of an additional failure metric that can be used relates to whether inter-data center redundancy is effective. For example, consider FIG. 2, and note that applications 116, 118, and 120 are hosted at both data center 102(1) and 102(2). Thus, even assuming application 116 is completely unavailable from data center 102(1), it may be that users can still access application 116 from data center 102(2). In a sense, data centers 102(1) and 102(2) are serving as a redundant device group on a macro level in this example.

An inter-data center redundancy metric may reflect whether inter-data center redundancy has been effective at mitigating any failures. Thus, if application 116 is completely unavailable from data center 102(1) but is available from data center 102(2), the inter-data center redundancy metric in this example could have a Boolean value of 1, indicating that application 116 successfully failed over to data center 102(2). If application 118 is completely unavailable from both data centers, the inter-data center redundancy metric can have a Boolean value of 0, indicating that application 118 did not successfully fail over. Policies can be defined on this metric in a manner analogous to that discussed above, e.g., any events related to the failure of application 118 (e.g., by devices situated between application 118 and the network root in architecture 100) may be prioritized ahead of events related to the failure of application 116.

Another example of a metric suitable for use with the disclosed concepts can quantify aggregated traffic loss over data centers. For example, assume data center 102(1) and 102(2) normally split traffic for application 116 evenly (50/50). Now, assume a failure event occurs at data center 102(1) and the traffic is redistributed so that data center 102(1) is only handling 20% of the traffic and data center 102(2) is handling 80% of the traffic. In this instance, an aggregate traffic loss metric may have a value of 0%, indicating the total traffic loss is 0% across both data centers. This is the case when the application traffic through the redundant group as a whole is not affected by the event, even though the event may be impactful at the device level for the failing device.

In contrast, assume the traffic is redistributed as 20% for data center 102(1) and 60% for data center 102(2). In this example, only 80% of the total traffic is being handled, so the aggregate traffic loss metric may have a value of 20% indicating there is 20% aggregate traffic loss. Note that some implementations may use other representations to quantify the extent of aggregate traffic loss instead of percentages.

Another example of metric suitable for use with the disclosed concepts is a metric reflecting the level within the data center hierarchy of a failing device. In the following example policies, the level of the failing device is used for ranking purposes. Generally, it can be useful to prioritize events closer to the root because these devices are responsible for carrying traffic from more downstream devices.

Example Policies and Policy Criteria

Figure 6:
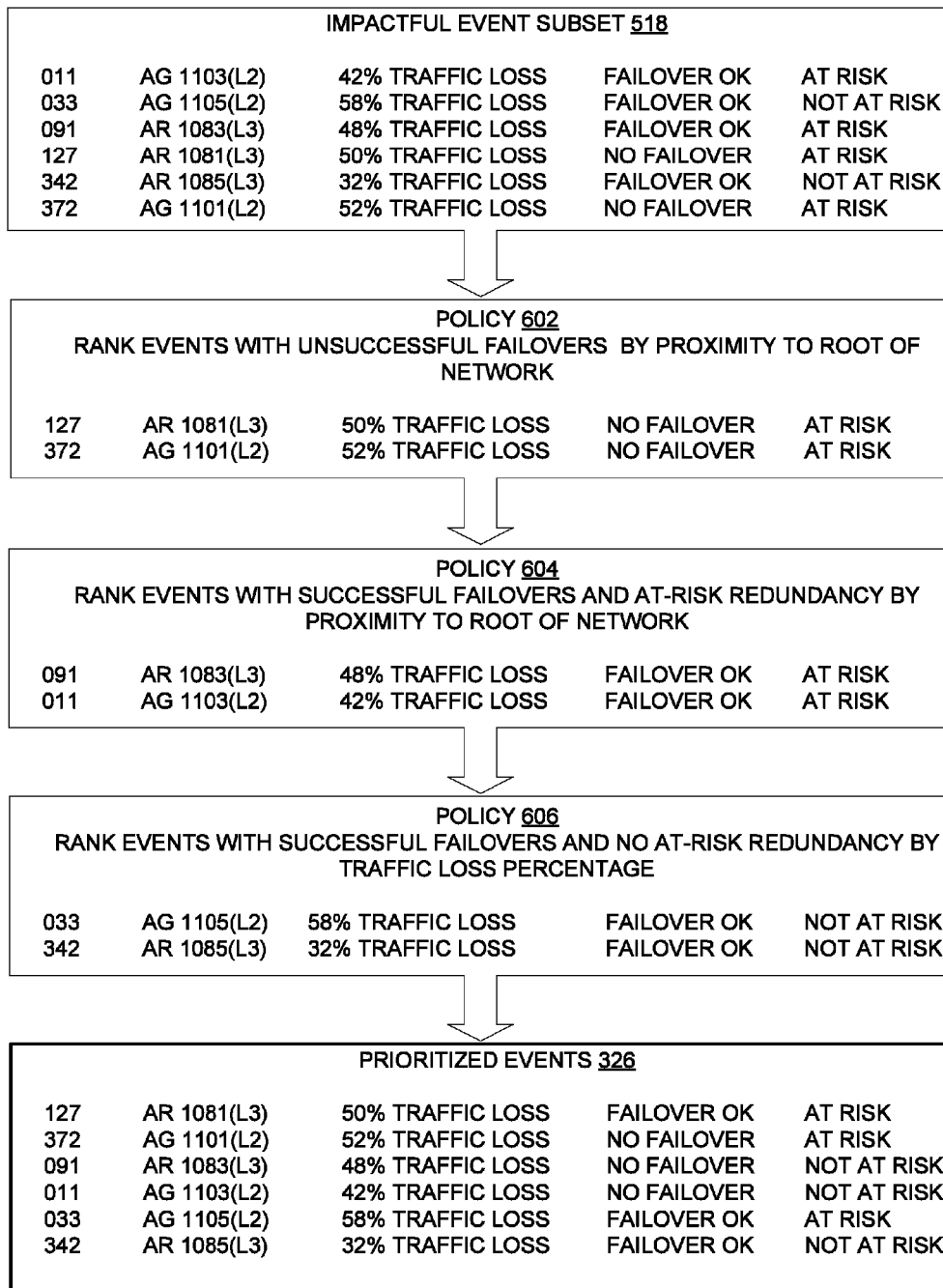
FIGS. 6 and 10 show exemplary prioritizing of events in accordance with some implementations.

FIG. 6 illustrates exemplary prioritizing of impactful events, consistent with certain implementations. Processing starts with impactful event subset 518, e.g., as output by method 500. For example, as discussed above, method 500 can apply various filters to output a group of impactful events for prioritizing. In FIG. 6, the impactful event subset is arranged in increasing order according to the event ID. However, impactful event subset 518 can be provided in any order to be processed by policies as discussed herein.

The following examples show how the impactful event subset 518 can be prioritized to obtain prioritized events 326 as shown in FIG. 3. Generally, the events in the impactful event subset are prioritized by applying one or more policies having one or more criteria. Each policy can also rank individual events that meet the criteria for that policy.

The events in the impactful event subset 518 are first processed by policy 602. Policy 602 relates to events that satisfy a single criterion—the events are by failing devices that were not handled by a successful failover. In other words, events that match policy 602 are events where there are no other redundantly-configured devices that managed to take over for the failing device. Policy 602 ranks any such events by their proximity to the root of architecture 100, e.g., core routers 106 can be viewed as the root of the architecture and racks 114 as leaves of the architecture.

Of the six events shown in impactful event subset 518, two events do not have successful failovers—events 127 and 372. Event 127 is at access router 108(1), which is in L3 aggregation layer 124. Event 372 is at aggregation switch 110(1), which is at L2 aggregation layer 126. Thus, event 127 is ranked higher than event 372 by policy 602.

The remaining four events in the impactful event subset 518 are next processed by policy 604. Policy 604 relates to events that satisfy two criteria—the events have successful failovers, but at-risk redundancy. Policy 604 ranks any events that meet these criteria by their proximity to the root of architecture 100, in a manner similar to that discussed above with respect to policy 602.

Of the four events remaining in the impactful event subset 518 (events 011, 033, 091, and 342), two events meet the criteria specified by policy 604—events 091 and 011. Event 091 is at access router 108(3), which is in L3 aggregation layer 124. Event 011 is at aggregation switch 110(3), which is at L2 aggregation layer 126. Thus, event 091 is ranked higher than event 011 by policy 604.

The remaining two events in the impactful event subset 518 are next processed by policy 606. Policy 606 relates to events that satisfy two criteria—the events have successful failovers and no at-risk redundancy. Policy 606 ranks any events that meet these criteria by their traffic loss percentages, such that events with higher traffic loss percentages are prioritized more highly than events with lower traffic loss percentages.

Both of the two events remaining in the impactful event subset 518 (events 033 and 342) meet the criteria specified by policy 606. Event 033 is at aggregation switch 1105, and has a traffic loss of 58%. Event 342 is at access router 1085, and has a traffic loss of 32%. Thus, event 033 is ranked higher than event 342. Note that policy 606 in this example ranks an event at the L2 layer higher than an event at the L3 layer, which was not the case for policies 602 and 604.

Note that the examples discussed above are merely exemplary and policies/criteria can be defined in many different ways. For example, some implementations may prioritize events based on the aforementioned latency metric as well, e.g., events relating to devices with relatively higher latency may be prioritized higher than events relating to devices with relatively lower latency. For devices with similar latency, the events may be prioritized based on proximity to the root, as discussed above. For example, individual events could be sorted into latency bins (e.g., 0%-10% latency inflation, 11%-20% latency inflation), etc., and the events within each bin could be prioritized based on proximity to the root. As another example, a metric could be derived from both latency inflation and proximity to the root, e.g., a mathematical function that uses both of these failure metrics as variables and outputs a value that is used to rank the events.

Note that some policies may also include associated automated tasks that are performed when certain event criteria are met. For example, an example policy may have criteria that if an event shows an access router failure with 100% traffic loss across the access router, an automatic reboot of the access router is performed. Other policies may specify disabling one or more ports associated with the event, deactivating one or more faulty links, rebooting/reconfiguring one or more switches, etc.

Policies may also be defined based on time to repair a given failure. For example, consider two events that have similar consequences but the first event typically takes far longer to repair than the second event. In this case, it may be useful to prioritize the second event so that at least the corresponding failure is resolved relatively quickly. As a specific example, handling the second event may involve a software reboot of the device that generated the second event whereas handling the first event may involve hardware component replacement on the device that generated the first event (e.g., a line card). Here, it can be useful to prioritize the second event higher than the first event because the software reboot may take less time than the line card replacement.

Policies may also use criteria that are based on the application or service that is potentially impacted for a given event, e.g., based on event property 340. For example, application 116 may be a particularly high-priority application, e.g., a real-time service with paying subscribers subject to strict service level agreement constraints. On the other hand, application 118 may be a relatively low-priority application, e.g., a free version of the service where there are no contractual obligations involved. In this example, events that potentially impact application 116 (e.g., events 127 and 372) may be ranked higher than events that impact application 118 (e.g., events 091 and 011).

For example, in some implementations, events that meet certain redundancy criteria can be ranked based on which applications are potentially affected by the events. One policy might specify that events with unsuccessful failovers are ranked by application, e.g., events associated with application 116 ranked higher than events associated with application 118, and events associated with application 118 ranked higher than events associated with application 120. Another policy might rank events with successful failovers and at-risk redundancy in a similar fashion.

Policies may also prioritize events based on performance criteria relating to hardware performance issues. As mentioned above, some events may be associated with high CPU or memory utilization on a given network device. One example policy might rank events associated with greater than 95% CPU utilization according to levels of the network hierarchy, e.g., so that an event associated with 96% CPU utilization by an access router may be ranked higher than an event associated with 99% CPU utilization by an aggregation switch. Note that further implementations may use such performance criteria for event prioritization in conjunction with other criteria mentioned herein.

Likewise, policies may prioritize events based on associated configuration changes. For example, events associated with a configuration change that blocks incoming traffic from a first set of IP addresses (e.g., a major customer) may be ranked above events associated with another configuration change that blocks incoming traffic from a different set of IP addresses (e.g., a less important customer). Likewise, events associated with packets having one destination address, e.g., a web page specifically for a major customer, may be ranked above other events associated with packets having a destination address for another web page that is utilized by another customer.

Note also that, while the examples above discussed with respect to FIG. 6 discuss device-level metrics, analogous processing can be performed on link-level metrics. For example, policies may have criteria relating to link-level traffic loss or inflation. Likewise, policies may have criteria relating to redundant failovers or at-risk redundancy for given links.

Example Visualizations

As mentioned above, block 412 of method 400 can involve outputting events, e.g., by one or more visualizations. A first example visualization is shown in GUI screenshot 324 of FIG. 3, listing prioritized events 326 in order of priority from top to bottom.

Figure 7:
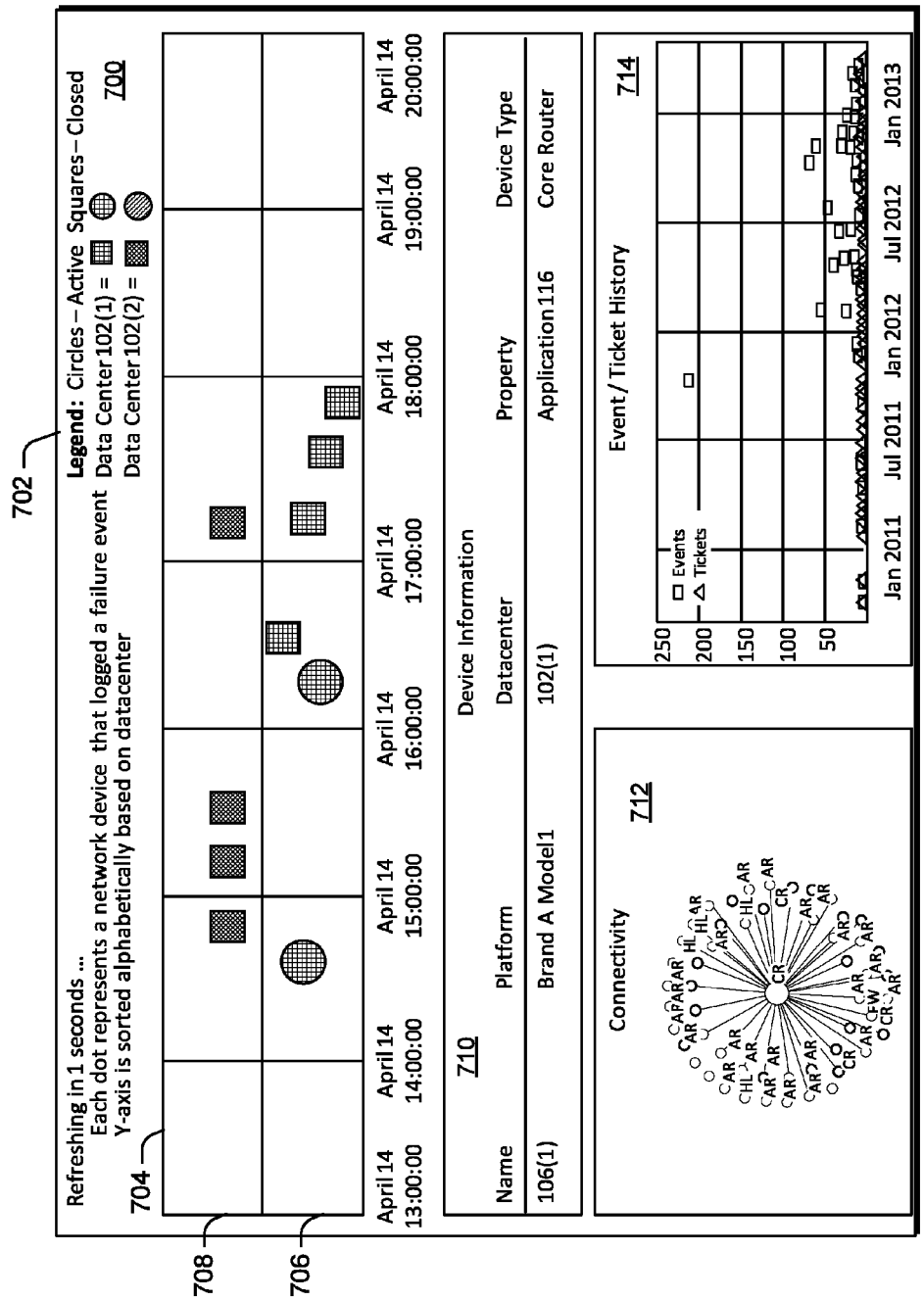

FIG. 7 illustrates another example visualization 700 that can be generated by the event analysis component 208. Visualization 700 can include a legend 702, an event graph area 704 with horizontal bands 706 and 708, a device information area 710, a connectivity area 712, and an event/ticket history area 714. In this example, legend 702 explains the meaning of different graphical elements shown in event graph area 704. For example, circles represent open events and squares represent closed events. Generally, an open event is an event that has yet to be resolved, while a closed event is an event that reached some sort of resolution, e.g., by repairing, replacing, or resetting a faulty device, or other maintenance/configuration activities.

Circles and squares with a horizontal/vertical pattern represent events from data center 102(1), and circles and squares with a crosshatched diagonal pattern represent events from data center 102(2). The X-axis of event graph area 704 is a time axis starting with earlier times to the left. Thus, the two most recent events shown in FIG. 7 are closed events at data center 102(1), and the earliest event is an open event from data center 102(1). The Y-axis of event graph area 704 represents both which data center a particular event is from, and which device generated the event. Note that the event graph area can also visually represent individual links that failed, e.g., instead of or in addition to representing the devices.

Events from data center 102(1) are shown in a lower horizontal band 706 and events from data center 102(2) are shown in an upper horizontal band 708 (note additional bands may be added for additional data centers). Within each band, the relative vertical position corresponds to the particular device that generated the corresponding event. Thus, note the events in horizontal band 708 are at the same vertical position, implying that the same device in data center 102(2) generated each event. In contrast, the events in horizontal band 706 are in different vertical positions, implying that different devices in data center 102(1) generated the events. Note that one specific alternative implementation can order the Y-axis by relative priority of the events, e.g., ordered by method 400 as discussed above.

Device information area 710 shows information about a device that generated a given event. For example, if a user clicks on or otherwise selects an individual event from event graph area 704, the device information area can be populated with information about the device that generated the event. Here, the information includes the device name, platform (e.g., brand & model), data center where the device is located, property (affected application or service), and device type. Some implementations use metadata about what devices are installed in various data centers to populate the device information area. For example, the metadata can be maintained by a network inventory management system. Analogously, visualization 700 can show information about links associated with individual events, e.g., a link identifier, connected devices, an impacted application or service, etc.

Connectivity area 712 shows connectivity information for the device that generated the selected event. For example, the connectivity information can illustrate some or all of the directly-connected neighbors of the device that generated the selected event. This can allow the user to see other devices that might also be impacted by the event. In further implementations, users can click an individual connected device in the connectivity area to pull up device information about that connected device in the device information area 710.

Event/ticket history area 714 shows events and/or maintenance tickets for the device that generated the selected event. The X-axis of the event/ticket history area represents time, and the Y-axis of the event/ticket history area represents the number of events/tickets for that device at a given time. In some implementations, users can also select individual events/tickets from the event/ticket history area to view details about the selected event or ticket.

FIG. 8 illustrates an exemplary event detail graphical user interface (GUI) 800 that can be shown separately from, or together with, visualization 700. For example, a user can select an individual event from event graph area 704 and/or event/ticket history area 714, and the event detail GUI can be populated with information about the selected event. Event detail GUI 800 includes a device information area 802, an event information area 804, and a property impact area 806. Generally, the device information area includes information about the device that generated the event, the event information area includes information about the selected event, and the property impact area includes information about applications and/or services that are impacted by the selected event.

The device information area 802 can include specific information such as the name of the device that failed and the name of the data center where that device is located. Further implementations can also include other information such as the name of specific links that caused the device to fail. Other device-related information can also be displayed in the device information area, e.g., software and/or hardware revisions, configuration settings, etc.

The event information area 804 can include information such as the traffic through a given device before an event occurred, expressed in megabytes per second (MBps) or megabits per second (Mbps). Likewise, the event information area can include information such as the traffic through the device during the duration of the event. In this example, traffic dropped from approximately 1900 MBps to 0 MBps during the event, meaning that the device essentially stopped communicating traffic.

The event information area 804 can also indicate the amount of estimated traffic that has been lost due to the event, expressed in Gigabytes (GB). The event information area can also indicate whether the corresponding event is open or closed, in this case, the event is closed. The duration represents the amount of time the event was open, in this case, 9.25 hours. The event information area can also indicate whether the event triggered a successful failover, in this case, the failover was successful.

The property impact area 806 indicates various other device types that were impacted by the event. For each device type, corresponding properties and numbers of devices are shown. The property name identifies applications and/or services in the subtree of the device that generated the event. In this example, application 116 is in the subtree of the event, and a firewall, two aggregation switches, a load balancer, and a ToR in the subtree of access router 108(1) are affected by the event.

Functional Failure Metrics

The above-introduced failure metrics generally fall into two categories, e.g., device- or link-level metrics describing latency inflation/traffic loss at an individual device, and redundancy-level metrics describing the effectiveness of redundancy at mitigating failures. Some further implementations provide functional metrics that characterize individual events based on whether the events have impacted proper functioning of a given device.

Figure 9:
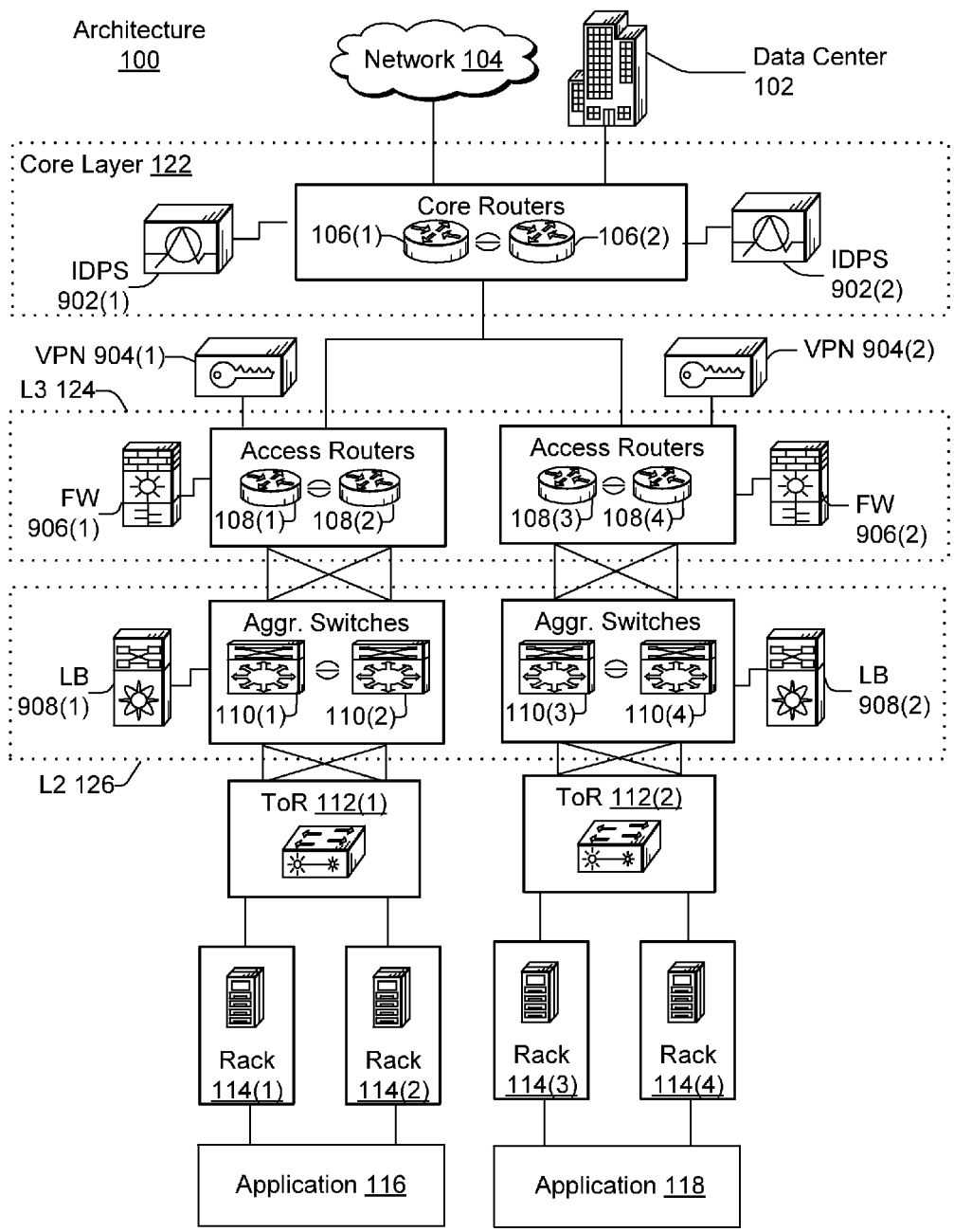

To facilitate the discussion of functional failure metrics, FIG. 9 shows architecture 100 in an alternative configuration that includes intrusion detection and prevention systems (IDPS) 902(1) and 902(2), virtual private networks (VPNs) 904(1) and 904(2), firewalls (FWs) 906(1) and 906(2), and load balancers (LBs) 908(1) and 908(2). The functionality of load balancers, firewalls, and VPNs are discussed above with respect to FIG. 1.

Consider a situation where incoming traffic is configured to be routed through firewall 906(1) before being received by either aggregation switch 110(1) and 110(2). In other words, the firewall is responsible for filtering out potential attack traffic so that the potential attack traffic does not reach either aggregation switch. Now, consider an event that causes some traffic to go directly to aggregation switch 110(1) and/or 110(2) without passing through the firewall. Here, there is a functional problem that may not be captured by the previously-introduced metrics, e.g., that the traffic is being forwarded incorrectly within the data center.

One example of a functional failure metric that can capture this scenario is a security threat metric indicating whether an event is associated with a security threat. For example, a Boolean value can be used with a 1 indicating that a given event is associated with a security threat, and a 0 indicating that there is no security threat. In the above example where traffic is bypassing the firewall, such a security threat metric could have a value of 1. Further implementations may characterize security threats using more refined values, e.g., a scale of 1-10 representing the severity of the threat.

Another functional failure metric indicates whether traffic is being incorrectly forwarded to a device, e.g., unnecessarily. For example, suppose firewall 906(1) is only responsible for traffic associated with application 116, and firewall 906(2) is only responsible for traffic associated with application 118. Further, suppose both firewalls are configured to perform similar or identical processing, e.g., packets filtered by one firewall would be filtered by the other firewall as well. An event that causes traffic destined for application 116 to be forwarded to both firewall 906(1) and firewall 906(2) may not be an immediate security concern if firewall 906(2) is able to handle the traffic and will filter the traffic appropriately. Nevertheless, this traffic flow is functionally incorrect in the sense that the traffic within data center 102 is flowing through an unintended device, firewall 906(2). Thus, some implementations may provide a traffic rule violation metric (e.g., a Boolean value) that indicates whether traffic flows through a path that violates predefined configuration rules for the data center. In this example, the traffic rule violation metric could have a value of 1 for an event that causes firewall 906(2) to receive extra traffic, but the security threat metric would have a value of 0 since there is no apparent security concern caused by the event. In contrast, an event that causes traffic to bypass both firewalls entirely could have a value of 1 for both the traffic rule violation metric and the security threat metric.

Some implementations may prioritize individual events based on combinations of one or more functional failure metrics, perhaps in conjunction with device-level, link-level, or redundancy-related failure metrics. For example, one policy could specify that events with security threats are prioritized over events without security threats, irrespective of traffic loss, latency, redundancy, or other failure metrics of the events. Of the events with security threats, the events can be ranked based on proximity to the root of the network. Another policy could prioritize individual events that have traffic rule violations but not security threats in a similar manner. Yet another policy could prioritize events for a particular class of applications, e.g., applications regarded as having business-critical or confidential data.

Figure 10:
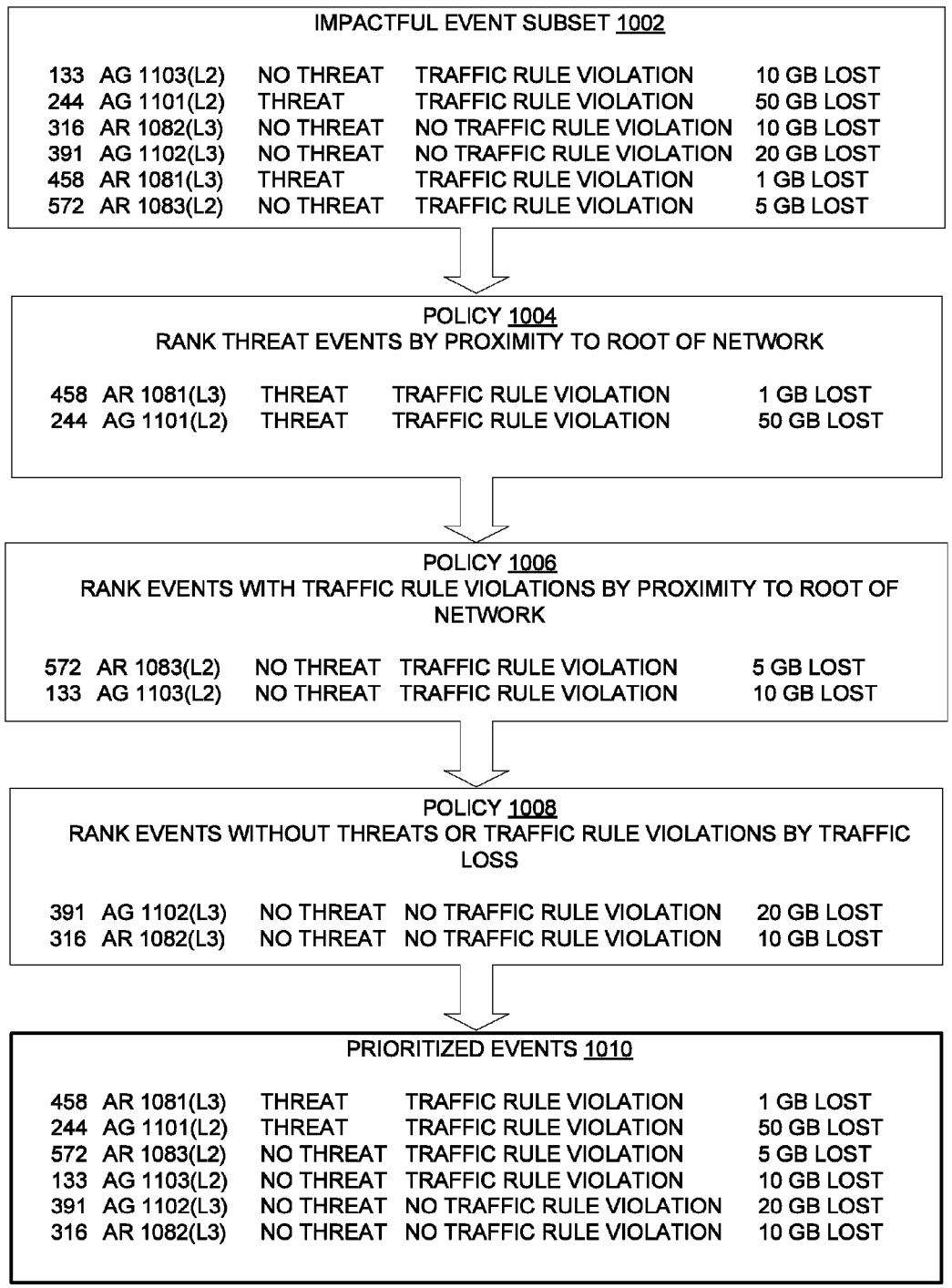

FIG. 10 illustrates another exemplary prioritizing of impactful events in a manner similar to that introduced above with respect to FIG. 6. FIG. 10 shows an impactful event subset 1002, including events 133, 244, 316, 391, 458, and 572. Each event is shown with the corresponding device that generated the event, followed by values for a security threat metric (THREAT or NO THREAT), a traffic rule violation metric (TRAFFIC RULE VIOLATION or NO TRAFFIC RULE VIOLATION), and a traffic loss metric (note expressed in gigabytes of traffic lost due to the event instead of the percentage examples set forth above).

First, policy 1004 ranks events with threats by proximity to the root of the network. Since events 244 and 458 meet the security threat criterion, these two events are ranked relative to each other by this policy. Here, event 458 is at an access router and event 244 is at an aggregation switch. Thus, event 458 is closer to the root of data center 102 and is ranked higher than event 244. Note that this can be the case even though event 244 lost more traffic than event 458.

Next, policy 1006 ranks events with traffic rule violations by proximity to the root. Of the remaining events 133, 316, 391, and 572, events 133 and 572 meet the traffic rule violation criterion so these two events are ranked relative to each other by this policy. Here, event 572 is ranked higher than event 133 for reasons similar to those introduced above, e.g., event 572 was generated by a device (access router 108(3)) that is closer to the root than the device that generated event 133 (aggregation switch 110(3)).

Next, policy 1008 ranks events without threats or traffic rule violations by traffic loss. Remaining event 391 lost more total traffic (20 GB) than remaining event 316 (10 GB), so event 391 is ranked higher than event 316. After policy 1008 is applied, each of the events in impactful event subset 1002 has been ranked as shown in prioritized events 1010.

Applications

In some implementations, the disclosed event analysis component can be provided as a tool that is intended to be deployed within a data center or to manage multiple data centers. For example, an entity that operates data centers 102(1) and 102(2) could deploy such a tool in a single location that manages both data centers. In this case, both data centers can provide their events to the tool and the tool can output a list of prioritized events that includes events from both data centers. In other implementations, copies of the tool can be separately deployed at each data center. In this case, each data center can have a separate list of ranked events.

Further implementations may also provide such a tool as a network service, e.g., a third party may operate analysis device 206. The entity operating data centers 102(1) and 102(2) can provide events to the third party analysis device, and use application interface 212 to view various visualizations or other outputs mentioned herein.

The above description provides some ways in which the disclosed concepts are employed, e.g., in data centers. However, the concepts discussed herein are applicable in environments other than data centers and are not necessarily tied to the hierarchical network topology shown herein. Rather, the disclosed implementations can be used in both data center and enterprise environments, Internet Service Providers, or other contexts where it is useful to understand the impact of various failure events. Note that the algorithmic details mentioned above can be modified to accommodate network topologies that are not hierarchical in nature or that are not organized in different levels.

CONCLUSION

The order in which the disclosed methods are described is not intended to be construed as a limitation, and any number of the described blocks can be combined in any order to implement the method, or an alternate method. Furthermore, the methods can be implemented in any suitable hardware, software, firmware, or combination thereof, such that a computing device can implement the method. In one case, the methods are stored on one or more computer-readable storage media as a set of instructions such that execution by a processor of a computing device causes the computing device to perform the method.

Although techniques, methods, devices, systems, etc., pertaining to characterizing service levels are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. One or more computer-readable storage devices storing instructions which, when executed by one or more processing devices, cause the one or more processing devices to perform acts comprising:
   obtaining multiple events that are generated by network devices in a networking environment;

processing the multiple events to identify a subset of impactful events from the multiple events, the subset of impactful events having associated device-level or link-level impacts of traffic loss or latency inflation;

determining a device-level or link-level failure metric for individual impactful events in the identified subset of impactful events, the device-level or link-level failure metric being determined based on the traffic loss or latency inflation associated with the individual impactful events;

determining a redundancy-related failure metric for the individual impactful events, the redundancy-related failure metric being associated with individual network devices or links in the networking environment that are configured to perform redundant failovers; and prioritizing the individual impactful events according to at least the device-level or link-level failure metric and the redundancy-related failure metric.

2. The one or more computer-readable storage devices of claim 1, the acts further comprising determining a data center failover metric for the individual impactful events that indicates whether a successful failover of an application occurs within a redundant group of data centers that host the application.

3. The one or more computer-readable storage devices of claim 2, the acts further comprising determining the data center failover metric by comparing aggregate application traffic loss across the redundant group of data centers before and after the individual impactful events.

4. The one or more computer-readable storage devices of claim 1, the acts further comprising determining a functional failure metric for the individual impactful events, the functional failure metric indicating whether the individual impactful events are associated with security threats or traffic rule violations in the networking environment.

5. The one or more computer-readable storage devices of claim 1, the acts further comprising generating a visualization that conveys, for a first one of the individual impactful events that was generated by a first network device, multiple other network devices that are directly connected to the first network device.

6. A system comprising:
an event analysis component configured to:
obtain multiple events that are generated by network devices in a networking environment,
identify impactful events from the multiple events, the impactful events having associated device-level or link-level impacts, and
determine one or more failure metrics for an individual impactful event, the one or more failure metrics including at least a first redundancy-related failure metric associated with redundant failovers in the networking environment, and
one or more processing devices configured to execute the event analysis component.

7. The system of claim 6, wherein the one or more failure metrics include a first device-level or link-level metric reflecting traffic loss or latency inflation associated with the individual impactful event.

8. The system of claim 7, wherein the first redundancy-related failure metric indicates whether a failover attempt within a redundant group of network devices or links is successful at handling the individual impactful event.

9. The system of claim 8, wherein the first device-level or link-level metric quantifies the traffic loss associated with the individual impactful event across an individual network device or individual link within the redundant group.

10. The system of claim 9, wherein the one or more failure metrics include a second device-level or link-level metric that quantifies the latency inflation associated with the individual impactful event for the individual network device.

11. The system of claim 10, wherein the one or more failure metrics include a second redundancy-related failure metric indicating whether the redundant group is at risk of an unsuccessful subsequent failover attempt.

12. The system of claim 11, wherein the second redundancy-related failure metric indicates whether another network device or another link within the redundant group is operating as a single point of failure.

13. A method implemented by at least one computing device, the method comprising:
obtaining multiple events that are generated by network devices in a networking environment;
identifying individual impactful events from the multiple events based on associated impacts to the networking environment or applications or services hosted thereon; and
prioritizing the individual impactful events using one or more policies having one or more criteria.

14. The method of claim 13, wherein the impacts to the networking environment include impacts on hardware performance of individual network devices or impacts caused by configuration changes in the networking environment.

15. The method of claim 13, wherein the one or more criteria include a first redundancy-related criterion relating to whether the redundant failover is successful.

16. The method of claim 15, wherein the impactful events are prioritized using the first redundancy-related criterion such that individual impactful events having unsuccessful failovers are prioritized above other individual impactful events having successful failovers.

17. The method of claim 13, wherein the one or more criteria include a hierarchy level criterion relating to levels of a networking environment hierarchy at which the individual impactful events occur or an affected application or service criterion relating to one or more of the applications or the services that are potentially affected by the individual impactful events.

18. The method of claim 17, wherein the impactful events are prioritized using the hierarchy level criterion such that individual impactful events closer to a root of the networking environment hierarchy are prioritized above other individual impactful events further away from the root of the networking environment hierarchy.

19. The method of claim 13, wherein the first redundancy-related criterion relates to whether a redundancy group is at risk of an unsuccessful failover.

20. The method of claim 19, wherein an individual policy specifies prioritizing the impactful events according to the first redundancy-related criterion such that individual impactful events associated with redundancy groups that are at risk for unsuccessful failovers are prioritized above other individual impactful events for other redundancy groups that are not at risk of unsuccessful failovers.

* * * * *